United States Patent
Hughes

(10) Patent No.: US 7,274,692 B1
(45) Date of Patent: Sep. 25, 2007

(54) METHOD AND APPARATUS FOR ROUTING PACKETS THAT HAVE MULTIPLE DESTINATIONS

(75) Inventor: William Alexander Hughes, Burlingame, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1118 days.

(21) Appl. No.: 09/968,845

(22) Filed: Oct. 1, 2001

(51) Int. Cl.
*H04L 12/28* (2006.01)

(52) U.S. Cl. .................. 370/389; 370/412; 370/413; 370/428; 370/401

(58) Field of Classification Search ............... 370/412, 370/413, 428, 468, 389, 401
See application file for complete search history.

(56) References Cited

U.S. PATENT DOCUMENTS

| | | | |
|---|---|---|---|
| 4,727,537 A | 2/1988 | Nichols | |
| 5,379,297 A * | 1/1995 | Glover et al. | 370/234 |
| 5,440,547 A | 8/1995 | Easki et al. | |
| 5,784,003 A * | 7/1998 | Dahlgren | 340/2.2 |
| 5,857,078 A | 1/1999 | Date | |
| 5,892,766 A | 4/1999 | Wicki et al. | |
| 5,898,687 A * | 4/1999 | Harriman et al. | 370/390 |
| 5,901,147 A | 5/1999 | Joffe | |
| 5,905,998 A * | 5/1999 | Ebrahim et al. | 711/144 |
| 5,915,104 A | 6/1999 | Miller | |
| 5,918,074 A * | 6/1999 | Wright et al. | 710/52 |
| 5,970,229 A * | 10/1999 | Thomas et al. | 709/212 |
| 6,295,295 B1 | 9/2001 | Wicklund | |
| 6,304,570 B1 | 10/2001 | Sakurai et al. | |
| 6,396,809 B1 * | 5/2002 | Holden et al. | 370/236 |
| 6,417,944 B1 * | 7/2002 | Lahat et al. | 398/79 |
| 6,484,224 B1 | 11/2002 | Robins et al. | |
| 6,542,502 B1 * | 4/2003 | Herring et al. | 370/390 |
| 6,553,446 B1 * | 4/2003 | Miller | 710/307 |
| 6,556,571 B1 * | 4/2003 | Shahrier et al. | 370/395.4 |
| 6,611,519 B1 * | 8/2003 | Howe | 370/386 |
| 6,629,147 B1 * | 9/2003 | Grow | 709/236 |
| 6,654,346 B1 | 11/2003 | Mahalingaiah et al. | |
| 6,661,774 B1 | 12/2003 | Lauffenburger et al. | |

(Continued)

FOREIGN PATENT DOCUMENTS

| EP | 1 052 816 | 11/2000 |
|---|---|---|
| WO | 97/03549 | 2/1997 |

OTHER PUBLICATIONS

International Search Report for PCT/US 02/26813, mailed Oct. 30, 2002, 6 pages.

*Primary Examiner*—Edan Orgad
*Assistant Examiner*—Andrew C. Lee
(74) *Attorney, Agent, or Firm*—Lawrence J. Merkel; Meyertons, Hood, Kivlin, Kowert & Goetzel, P.C.

(57) ABSTRACT

A node includes input ports that are configured to receive packets from other nodes or from devices coupled to the node and output ports that are configured to send packets to other nodes or devices. Scheduling logic may control how packets that are received via the input ports are routed to the output ports. An input port may receive a packet that has multiple destinations or recipients. The scheduling logic may be configured to route this multi-destination packet to at least one of the output ports if at least one of the packet's recipients has an input buffer available to receive the packet.

29 Claims, 22 Drawing Sheets

U.S. PATENT DOCUMENTS

| | | | |
|---|---|---|---|
| 6,674,754 B1 * | 1/2004 | Ofek | 370/389 |
| 6,687,247 B1 | 2/2004 | Wilford et al. | |
| 6,735,679 B1 * | 5/2004 | Herbst et al. | 711/167 |
| 6,745,277 B1 | 6/2004 | Lee et al. | |
| 6,751,698 B1 * | 6/2004 | Deneroff et al. | 710/317 |
| 6,754,211 B1 * | 6/2004 | Brown | 370/389 |
| 6,754,222 B1 | 6/2004 | Joung et al. | |
| 6,760,337 B1 | 7/2004 | Snyder et al. | |
| 6,768,717 B1 | 7/2004 | Reynolds et al. | |
| 6,781,994 B1 * | 8/2004 | Nogami et al. | 370/395.1 |
| 6,907,001 B1 * | 6/2005 | Nakayama et al. | 370/230 |
| 6,912,637 B1 * | 6/2005 | Herbst | 711/167 |
| 6,940,814 B1 * | 9/2005 | Hoffman | 370/235 |
| 6,950,394 B1 * | 9/2005 | Chou et al. | 370/229 |
| 6,950,430 B2 * | 9/2005 | Kalkunte et al. | 370/389 |
| 6,952,401 B1 * | 10/2005 | Kadambi et al. | 370/232 |
| 6,959,002 B2 | 10/2005 | Wynne et al. | |
| 6,975,638 B1 | 12/2005 | Chen et al. | |
| 6,996,099 B1 | 2/2006 | Kadambi et al. | |
| 6,999,415 B2 * | 2/2006 | Luijten et al. | 370/230 |
| 7,002,926 B1 * | 2/2006 | Eneboe et al. | 370/255 |
| 7,145,869 B1 | 12/2006 | Kadambi et al. | |
| 2003/0035371 A1 * | 2/2003 | Reed et al. | 370/230 |

* cited by examiner

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |
| 3 | | | | | | | | |
| 4 | | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

| CMD Code | Command | Packet Type |
|---|---|---|
| 000000 | Nop | Info |
| 000001 | VicBlk | Command/Data |
| 000010 | Reserved | |
| 000011 | ValidateBlk | Command |
| 000100 | RdBlk | Command |
| 000101 | RdBlkS | Command |
| 000110 | RdBlkMod | Command |
| 000111 | ChangetoDirty | Command |
| x01xxx | WrSized | Command/Data |
| 01xxxx | ReadSized | Command |
| 100xxx | Reserved | |
| 110000 | RdResponse | Response/Data |
| 110001 | ProbeResp | Response |
| 110010 | TgtStart | Response |
| 110011 | TgtDone | Response |
| 110100 | SrcDone | Response |
| 110101 | MemCancel | Response |
| 11011x | Reserved | |
| 11100x | Probe | Command |
| 11101x | Broadcast | Command |
| 11110x | Reserved | |
| 111110 | Reserved | |
| 111111 | Sync | Info |

Pipeline:

Stage 1: Generate & latch entry ready signals for all entries in the scheduler.
Stage 2: Pick oldest ready entry in each subgroup, mark picked entries "in the pipe"
Stage 3: Pick oldest ready entry picked in each stage, mark unpicked entries "not in the pipe.
Stage 4: Read entry data from entry selected in Stage 3.
Stage 5: Recheck readiness, if still ready, commit and update buffer counts
Stage 6: Send packet, delete entry selected in Stage 3.

| Scheduling Turn # | Pipeline Clock | | | | | | | | | |
|---|---|---|---|---|---|---|---|---|---|---|
| | 1 | 2 | 3 | 4 | 5 | 6 | 7 | 8 | 9 | 10 |
| 1 (normal) | Stage 1 | Stage 2 | Stage 3 | Stage 4 | Stage 5 | Stage 6 | | | | |
| 2 (stage 3 repeated) | | Stage 1 | Stage 2 | Stage 3 | Stage 3 | Stage 4 | Stage 5 | Stage 6 | | |
| 3 (fails to commit) | | | Stage 1 | Stage 2 | stall | Stage 3 | Stage 4 | Stage 5 | | |
| 4 | | | | Stage 1 | stall | Stage 2 | Stage 3 | Stage 4 | | |
| 3 (restarted) | | | | | | | | | Stage 1 | Stage 2 |
| 4 (restarted) | | | | | | | | | | Stage 1 |

*Fig. 20A* tions through bus arbitration. Accordingly, a fair arbitration algorithm allows each bus participant the opportunity to initiate transactions. The order of transactions on the bus may represent the order that transactions are performed (e.g., for coherency purposes). On the other hand, in distributed memory systems, nodes may initiate transactions concurrently and use the interconnect to transmit the transactions to other nodes. These transactions may have logical conflicts between them (e.g., coherency conflicts for transactions to the same address) and may experience resource conflicts (e.g., buffer space may not be available in various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

METHOD AND APPARATUS FOR ROUTING PACKETS THAT HAVE MULTIPLE DESTINATIONS

BACKGROUND OF THE INVENTION

1. Field of the Invention

This invention relates to computer and network systems and, more particularly, to routing packets in a computer or network system.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge that manages the transfer of information between the shared bus and the I/O devices, and processors are typically coupled directly to the shared bus or are coupled through a cache hierarchy to the shared bus.

Unfortunately, shared bus systems may experience several drawbacks. For example, since there are multiple devices attached to the shared bus, the bus is typically operated at a relatively low frequency. The multiple attachments present a high capacitive load to a device driving a signal on the bus, and the multiple attach points present a relatively complicated transmission line model for high frequencies. Accordingly, the frequency remains low, and thus the bandwidth available on the shared bus is relatively low. The low bandwidth presents a barrier to attaching additional devices to the shared bus, since additional devices may negatively impact performance.

Another disadvantage of the shared bus system is a lack of scalability to larger numbers of devices. As mentioned above, the amount of bandwidth is fixed (and may decrease if adding additional devices reduces the operable frequency of the bus). Once the bandwidth requirements of the devices attached to the bus (either directly or indirectly) exceeds the available bandwidth of the bus, devices will frequently be stalled when attempting access to the bus. As a result, overall performance may be decreased.

One or more of the above problems may be addressed by using a distributed memory system. A computer system employing a distributed memory system includes multiple nodes. Two or more of the nodes are connected to memory, and the nodes are interconnected using any suitable interconnect. For example, each node may be connected to each other node using dedicated lines. Alternatively, each node may connect to a fixed number of other nodes, and transactions may be routed from a first node to a second node to which the first node is not directly connected via one or more intermediate nodes. The memory address space is assigned across the memories in each node.

Generally, a "node" is a device which is capable of participating in transactions upon the interconnect. For example, in a packet-based interconnect the node may be configured to receive and transmit packets to other nodes. One or more packets may be employed to perform a particular transaction. A particular node may be a destination for a packet, in which case the information is accepted by the node and processed internally in the node. Alternatively, the particular node may be used to relay a packet from a source node to a destination node if the particular node is not the destination node of the packet.

Distributed memory systems present design challenges that differ from the challenges in shared bus systems. For example, shared bus systems regulate the initiation of trans By employing virtual channels and allocating different resources to the virtual channels, conflicts may be reduced. Generally speaking, a "virtual channel" is a communication path for initiating transactions (e.g., by transmitting packets containing commands) between various processing nodes. Each virtual channel may be resource-independent of the other virtual channels (i.e., packets flowing in one virtual channel are generally not affected, in terms of physical transmission, by the presence or absence of packets in another virtual channel). Packets that do not have logical/protocol-related conflicts may be grouped into a virtual channel. For example, packets may be assigned to a virtual channel based upon packet type. Packets in the same virtual channel may physically conflict with each other's transmission (i.e., packets in the same virtual channel may experience resource conflicts), but may not physically conflict with the transmission of packets in a different virtual channel (by virtue of the virtual channels being resource-independent of each other). Accordingly, logical conflicts occur between packets in separate virtual channels. Since packets that may experience resource conflicts do not experience logical conflicts and packets which may experience logical conflicts do not experience resource conflicts, deadlock-free operation may be achieved.

In order to avoid deadlock, virtual channels may need to be able to make progress independently. If not, both logical and resource conflicts may arise between packets, providing an opportunity for deadlock. For example, assume a first virtual channel includes packets that contain requests for data from a memory controller. In order to process each request, the memory controller may send responses to the requests in a second virtual channel. In order to avoid deadlock, neither the first nor the second virtual channel should be able to block each other. However, the first virtual channel may be blocked if packets are unable to progress because the memory controller's queue (for receiving packets in the first virtual channel) is full. In order to process the first packet in the first virtual channel's queue in the memory controller, thus freeing up room in the queue to accept more packets from the first virtual channel, a response to the request in the first packet may need to be sent in the second virtual channel. If responses cannot be sent in the second virtual channel due to the blocked first virtual channel, deadlock may arise.

In addition to deadlock, another concern that may arise when implementing a packet-based system using virtual channels is starvation. Starvation may occur if one interface (e.g., an interface to another node or to a device, like a memory controller, that is internal to a node) in a node is unable to share the available bandwidth in a particular virtual channel. System performance is another concern. Generally, it may be preferable to route "older" packets (i.e., those that have been waiting to be routed for a longer amount of time) before "newer" packets. Physically routing the interconnections between the interfaces and devices within a node may present an additional problem. In general, it may be preferable to have fewer and shorter interconnections. However, each interface within a node may need to be able to send and receive packets in each virtual channel from each other interface in the node. Providing this capability may lead to complex physical interconnections within the node.

SUMMARY

Various embodiments of methods and systems for routing packets are disclosed. In one embodiment, a node includes several input ports that are configured to receive packets from other nodes or from devices coupled to the node. The node may also include several output ports that each output packets to other nodes or devices. Scheduling logic may control how packets that are received via the input ports are routed to the output ports. In some embodiments, similar scheduling logic may control how packets are routed through a network device.

One of the input ports may receive a packet that has multiple destinations or recipients. The scheduling logic may be configured to route this multi-destination packet to at least one of the output ports if at least one of the packet's recipients has an input buffer available to receive the packet. Thus, if only one of the packet's recipients has an input buffer available to receive the packet, the scheduling logic may route the packet to that one destination. The scheduling logic may continue to route the packet until it has been routed to all of its destinations. In some embodiments, the traffic through the node may be subdivided into virtual channels, and determining whether a recipient has an input buffer available may involve determining whether the recipient has an input buffer available in the packet's virtual channel.

Once the packet has been routed, the scheduling logic may modify routing data for the packet so that the routing data no longer identifies the destinations the packet has already been routed to as recipients. This way, the scheduling logic may track which recipients the packet has been sent to and avoid sending the packet to the same recipient more than once. For example, a scheduler may allocate entries for packets that are received by the node. When a multi-destination packet is received, the scheduler may allocate an entry that identifies all of the packet's recipients, and the scheduling logic may use the data in this entry to route the packet. The entry may include a destination or recipient bit for each possible destination in the node (e.g., each output port and/or each device or node coupled to receive packets from the node), and each bit may be set or cleared to indicate whether a respective potential recipient is a recipient of the multi-destination packet. Each time the scheduling logic routes the packet to one or more of its destinations, the scheduling logic may update the destination bits so that the destinations identified in the entry are the destinations to which the packet has yet to be routed.

The node may include several registers that each track how many input buffers are available at each destination or recipient. After sending the packet to one or more of its destinations, the scheduling logic may update the counts that correspond to the destinations that the packet was routed to so that the counts show that one fewer input buffer is available.

In another embodiment, a method of routing packets is disclosed. The method includes receiving a first packet that has two or more recipients via an input port, determining which of the first packet's recipients have at least one input buffer available to receive the first packet, and if at least one recipient of the first packet has an input buffer available to receive the first packet, routing the first packet to a first portion of the recipients, where each recipient in the first portion of recipients has at least one input buffer available. Routing may involve routing the first packet to a first portion of a plurality of output ports, wherein each output port in the first portion of the output ports outputs packets to a respective one of the first portion of the recipients.

BRIEF DESCRIPTION OF THE DRAWINGS

FIG. 3 is a block diagram of one embodiment of an information packet.

FIG. 4 is a block diagram of one embodiment of a command packet.

FIG. 5 is a block diagram of one embodiment of a response packet.

FIG. 6 is a block diagram of one embodiment of a data packet.

FIG. 7 is a table illustrating one embodiment of packet definitions.

FIG. 20A is shows one embodiment of a pipelined scheduler.

Figure 1:
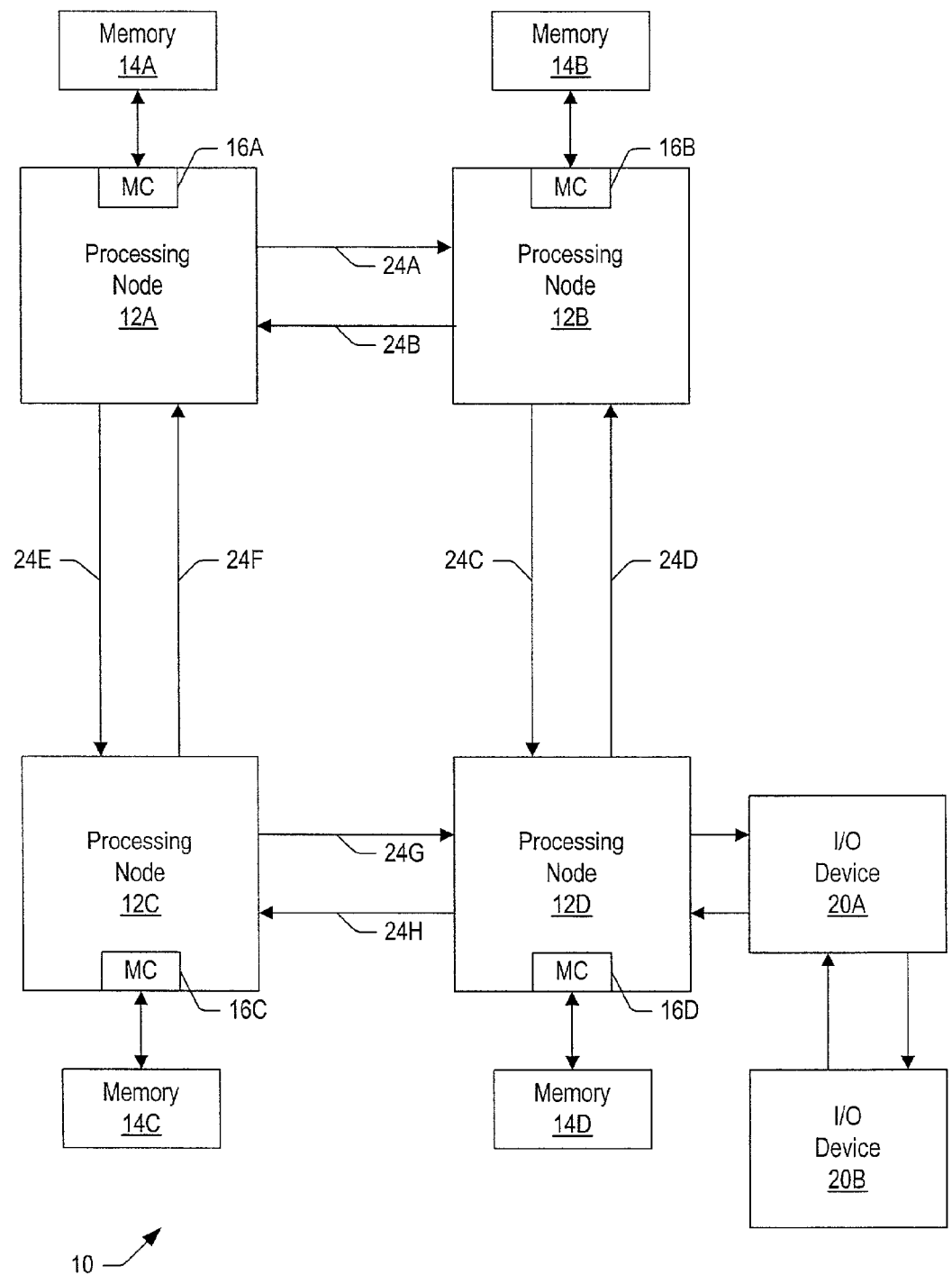
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Each processing node may be coupled to a respective memory 14A-14D via a memory controller 16A-16D included within each respective processing node 12A-12D. Additionally, processing nodes 12A-12D include interface logic used to communicate between the processing nodes 12A-12D. For example, processing node 12A may include interface logic for communicating with processing node 12B, processing node 12C, and yet another processing node (not shown). Processing nodes 12B, 12C, and 12D may include similar interface logic. Processing node 12D may be coupled to communicate with an input/output (I/O) device 20A via interface logic, and I/O device 20A may be further coupled to a second I/O device 20B. Other processing nodes may communicate with other I/O devices in a similar fashion. Alternatively, a processing node may communicate with an I/O bridge that is coupled to an I/O bus.

Processing nodes 12A-12D implement a packet-based link for inter-processing node communication. In the present embodiment, the link is implemented as sets of unidirectional lines (e.g., lines 24A are used to transmit packets from processing node 12A to processing node 12B and lines 24B are used to transmit packets from processing node 12B to processing node 12A). Other sets of lines 24C-24H may be used to transmit packets between other processing nodes, as illustrated in FIG. 1. The link may be operated in a cache coherent fashion for communication between processing nodes or in a non-coherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C, as shown in FIG. 1. Any suitable routing algorithm may be used to effect the desired routing between nodes. Other embodiments of computer system 10 may include more or fewer processing nodes than the embodiment shown in FIG. 1.

All or some of processing nodes 12A-12D may include one or more processors. Broadly speaking, a processing node may include a processor and a memory controller for communicating with a memory and other logic as desired. As used herein, a "node" is a device which is capable of participating in transactions upon the interconnect.

Memories 14A-14D may include any suitable memory devices. For example, a memory 14A-14D may comprise one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address is to be routed. In one embodiment, the coherency point for an address within computer system 10 is the memory controller 16A-16D coupled to the memory storing bytes corresponding to the address. Memory controllers 16A-16D may include control circuitry for interfacing to memories 14A-14D. Additionally, memory controllers 16A-16D may include request queues for queuing memory requests.

Generally, the interface logic of each node may include buffers for receiving packets from the link and for buffering packets to be transmitted upon the link. Computer system 10 may employ any suitable flow control mechanism for transmitting packets. For example, in one embodiment, each node stores a count of the number of each type of buffer within the receiver at the other end of the link to which each interface logic is connected. The node does not transmit a packet unless the receiving node has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 20A-20B are illustrative of any desired peripheral devices. For example, I/O devices 20A-20B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB (General Purpose Interface Bus) or field bus interface cards.

Figure 2:
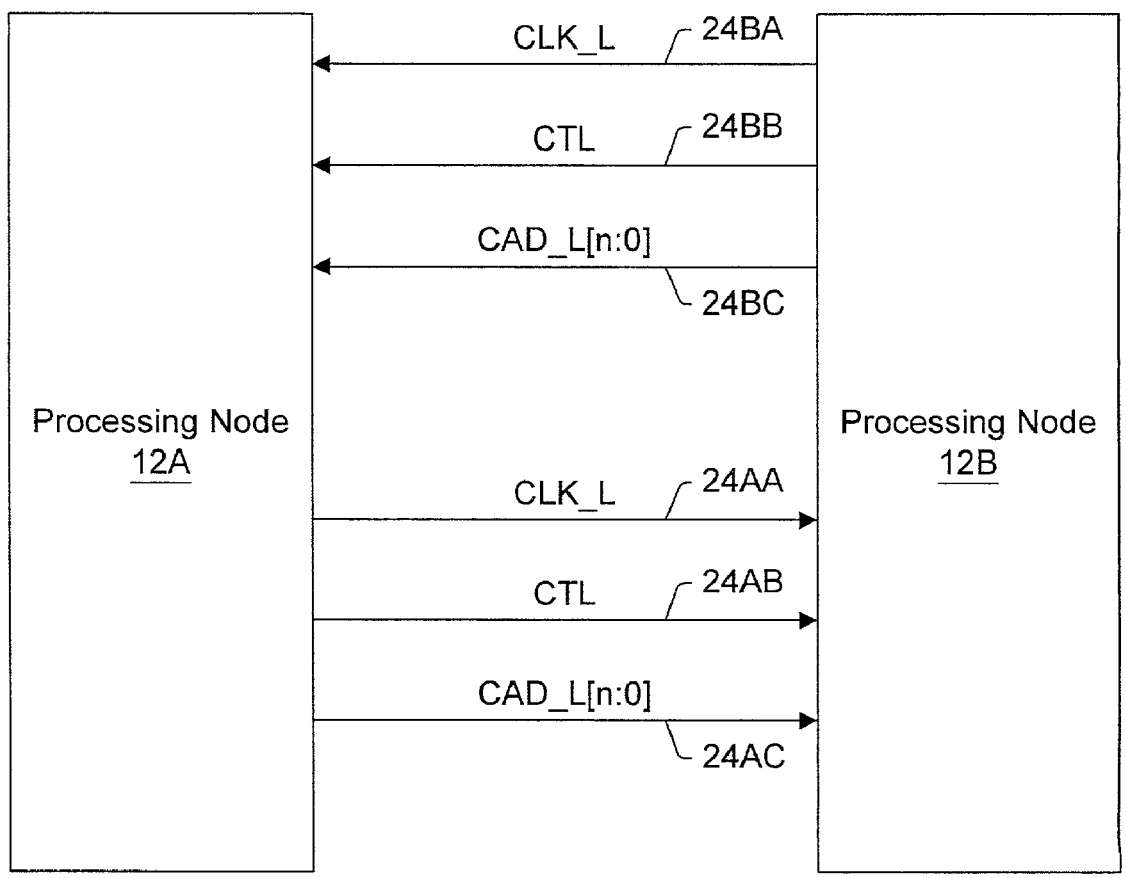
FIG. 2 is a block diagram of one embodiment of a pair of nodes shown in FIG. 1, highlighting one embodiment of interconnection therebetween.

Turning next to FIG. 2, a block diagram of processing nodes 12A and 12B illustrates one embodiment of the links in more detail. Other embodiments are possible and contemplated. In the embodiment of FIG. 2, lines 24A include a clock line 24AA, a control line 24AB, and a control/address/data bus 24AC. Similarly, lines 24B include a clock line 24BA, a control line 24BB, and a control/address/data bus 24BC.

The clock line may transmit a clock signal that indicates a sample point for the control line and the control/address/data bus. In one particular embodiment, data/control bits may be transmitted on each edge (i.e., rising edge and falling edge) of the clock signal. Accordingly, two data bits per line may be transmitted per clock cycle. The amount of time employed to transmit one bit per line is referred to herein as a "bit time." The above-mentioned embodiment may include two bit times per clock cycle. A packet may be transmitted across two or more bit times. Multiple clock lines may be used depending upon the width of the control/address/data bus. For example, two clock lines may be used for a 32-bit control/address/data bus (with one half of the control/address/data bus referenced to one of the clock lines and the other half of the control/address/data bus and the control line referenced to the other clock line).

The control line indicates whether the data transmitted upon the control/address/data bus is a bit time of a control packet or a bit time of a data packet. The control line may be asserted to indicate a bit time of a control packet and deasserted to indicate a bit time of a data packet. Certain control packets may indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. In one embodiment, only control packets that do not indicate that a data packet will be following may interrupt a data packet. Additionally, in one embodiment, the control line may be deasserted during transmission of a control packet to indicate stall bit times. A subsequent reassertion of the control line may indicate that the control packet is continuing.

The control/address/data bus comprises a set of lines for transmitting the data/control bits. In one embodiment, the control/address/data bus may comprise 8, 16, or 32 lines. Each processing node or I/O bridge may employ any one of the supported numbers of lines according to design choice. Other embodiments may support other sizes of control/address/data bus as desired.

According to one embodiment, the command/address/data bus lines and the clock line may carry inverted data (i.e., a logical one is represented as a low voltage on the line, and a logical zero is represented as a high voltage). Alternatively, lines may carry non-inverted data (in which a logical one is represented as a high voltage on the line, and logical zero is represented as a low voltage).

Turning now to FIGS. 3-6, exemplary packets employed in one embodiment of system 10 are shown. FIGS. 3-5 illustrate control packets and FIG. 6 illustrates a data packet. Other embodiments may employ different packet definitions, as desired. Each of the packets is illustrated as a series of bit times enumerated under the "bit time" heading. The bit times of the packet are transmitted according to the bit time order listed. FIGS. 3-6 illustrate packets for an eight-bit control/address/data bus implementation. Accordingly, each bit time comprises eight bits numbered seven through zero. Bits for which no value is provided in the figures either may be reserved for a given packet, or may be used to transmit packet-specific information. Fields indicated by dotted lines indicate optional fields that may not be included in all of the packets of a certain type.

Generally, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets may specify that a data packet follows. The data packet carries data corresponding to the transaction and corresponding to the specifying control packet.

FIG. 3 illustrates an information packet (info packet) 30. Info packet 30 comprises four bit times on an eight-bit link. In the present embodiment, the command encoding is transmitted during bit time one and comprises six bits. Each of the other control packets shown in FIGS. 4 and 5 include the command encoding in the same bit positions during bit time 1. Info packet 30 may be used to transmit messages between processing nodes when the messages do not include a memory address. Additionally, info packets may be used to transmit buffer free counts in embodiments using the coupon-based flow control scheme.

FIG. 4 illustrates one embodiment of a request packet 32. Request packet 32 comprises eight bit times on an eight-bit link. The command encoding is transmitted during bit time 1. A source unit number is transmitted during bit time 1 as well, and a source node number is transmitted during bit time two. A node number unambiguously identifies one of the processing nodes 12A-12D within computer system 10 and is used to route the packet through computer system 10. The unit number identifies which unit within the node is the source of the transaction (source unit number) or which is the destination of the transaction (destination unit number). Units may include memory controllers, caches, processors, etc. Optionally, request packet 32 may include either a destination node number and destination unit in bit time 2 (or a target node number and target unit, for some other packets). If the destination node number is included, it is used to route the packet to the destination node. In addition, many request packets may include a source tag in bit time 3 that, together with the source node and source unit, may link the packet to a particular transaction of which it is a part. Bit times five through eight are used transmit the most significant bits of the memory address affected by the transaction. Request packet 32 may be used to initiate a transaction (e.g. a read or write transaction), as well as to transmit requests in the process of carrying out the transaction for those commands that carry the memory address affected by the transaction. Generally, a request packet indicates an operation to be performed by the destination node.

Some of the undefined fields in packet 32 may be used in various request packets to carry packet-specific information. Furthermore, bit time 4 may be used in some requests to transmit the least significant bits of the memory address affected by the transaction.

FIG. 5 illustrates one embodiment of a response packet 34. Response packet 34 includes the command encoding and a destination node number and destination unit number. The destination node number identifies the destination node for the response packet (which may, in some cases, be the source node or target node of the transaction). The destination unit number identifies the destination unit within the destination node. Various types of response packets may include additional information. For example, a read response packet may indicate the amount of read data provided in a following data packet. Probe responses may indicate whether a copy of the requested block is being retained by the probed node. Generally, response packet 34 is used for commands during the carrying out of a transaction that do not require transmission of the memory address affected by the transaction. Furthermore, response packet 34 may be used to transmit positive acknowledgement packets to terminate a transaction. Similar to the request packet 32, response packet 34 may include the source node number, the source unit number, and the source tag for many types of responses (illustrated as optional fields in FIG. 5).

FIG. 6 illustrates one embodiment of a data packet 36. Data packet 36 includes eight bit times on an eight-bit link in the embodiment of FIG. 6. Data packet 36 may comprise different numbers of bit times dependent upon the amount of data being transferred. For example, in one embodiment a block comprises 64 bytes and hence 64 bit times on an eight-bit link. Other embodiments may define a block to be of a different size, as desired. Additionally, data may be transmitted in less than block sizes for non-cacheable reads and writes. Data packets for transmitting data less than block size employ fewer bit times. In one embodiment, non-block sized data packets may transmit several bit times of byte enables prior to transmitting the data to indicate which data bytes are valid within the data packet. Furthermore, block data may be returned with the quadword addressed by the least significant bit of the request address first, followed by interleaved return of the remaining quadwords. A quadword may comprise 8 bytes in one embodiment.

FIGS. 3-6 illustrate packets for an eight-bit link. Packets for 16 and 32 bit links may be formed by concatenating consecutive bit times illustrated in FIGS. 3-6. For example, bit time one of a packet on a 16-bit link may comprise the information transmitted during bit times one and two on the eight-bit link. Similarly, bit time one of the packet on a 32-bit link may comprise the information transmitted during bit times one through four on the eight-bit link. Formulas 1 and 2 below illustrate the formation of bit time one of a 16-bit link and bit time one of a 32-bit link according to bit times from an eight-bit link.

$$BT1_{16}[15:0] = BT2_8[7:0] \| BT1_8[7:0] \quad (1)$$

$$BT1_{32}[31:0] = BT4_8[7:0] \| BT3_8[7:0] \| BT2_8[7:0] \| BT1_8[7:0] \quad (2)$$

Turning now to FIG. 7, a table 38 is shown illustrating packets employed according to one exemplary embodiment of the coherent link within computer system 10. Other embodiments are possible and contemplated, including any other suitable set of packets and command field encodings. Table 38 includes a command code column illustrating the command encodings assigned to each command, a command column naming the command, and a packet type column indicating which of control packets 30-34 (and data packet 36, where specified) is employed for that command.

A read transaction is initiated using one of the ReadSized, RdBlk, RdBlkS or RdBlkMod commands. The ReadSized command is used for non-cacheable reads or reads of data other than a block in size. The amount of data to be read is encoded into the ReadSized command packet. For reads of a block, the RdBlk command may be used unless: (i) a writeable copy of the block is desired, in which case the RdBlkMod command may be used; or (ii) a copy of the block is desired but no intention to modify the block is known, in which case the RdBlkS command may be used. The RdBlkS command may be used to make certain types of coherency schemes (e.g., directory-based coherency schemes) more efficient. In general, the appropriate read command is transmitted from the source initiating the transaction to a target node that owns the memory corresponding to the block. The target node transmits Probe commands (indicating return of probe responses to the source of the transactions) to the other nodes in the system to maintain coherency by changing the state of the block in those nodes and by causing a node including an updated copy of the block to send the block to the source node. Each node receiving a Probe command transmits a ProbeResp response packet to the source node. If a probed node has an updated copy of the read data (i.e., dirty data), that node transmits a RdResponse response packet and the dirty data. A node transmitting dirty data may also transmit a MemCancel response packet to the target node in an attempt to cancel transmission by the target node of the requested read data. Additionally, the memory controller in the target node transmits the requested read data using a RdResponse response packet followed by the data in a data packet. If the source node receives a RdResponse response packet from a probed node, that read data is used. Otherwise, the data from the target node is used. Once each of the probe responses and the read data is received in the source node, the source node transmits a SrcDone response packet to the target node as a positive acknowledgement of the termination of the transaction.

A write transaction is initiated using a WrSized or VicBlk command followed by a corresponding data packet. The WrSized command is used for non-cacheable writes or writes of data other than a block in size. To maintain coherency for WrSized commands, the target node transmits Probe commands (indicating return of probe response to the target node of the transaction) to each of the other nodes in the system. In response to Probe commands, each probed node transmits a ProbeResp response packet to the target node. If a probed node is storing dirty data, the probed node responds with a RdResponse response packet and the dirty data. In this manner, a block updated by the WrSized command is returned to the memory controller for merging with the data provided by the WrSized command. The memory controller, upon receiving probe responses from each of the probed nodes, transmits a TgtDone response packet to the source node to provide a positive acknowledgement of the termination of the transaction. The source node replies with a SrcDone response packet.

A victim block that has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data is to be committed or a MemCancel response packet to indicate that the data has been invalidated between transmission of the VicBlk command and receipt of the TgtDone response packet (e.g., in response to an intervening probe).

The ChangetoDirty request packet may be transmitted by a source node in order to obtain write permission for a block stored by the source node in a non-writeable state. A transaction initiated with a ChangetoDirty command may operate similar to a read except that the target node does not return data. The ValidateBlk command may be used to obtain write permission to a block not stored by a source node if the source node intends to update the entire block. While no data is transferred to the source node for such a transaction, the transaction otherwise operates similar to a read transaction.

The TgtStart response may be used by a target to indicate that a transaction has been started (e.g., for ordering of subsequent transactions). The Nop info packet is a no-operation packet which may be used to transfer information such as buffer free indications between nodes. The Broadcast command may be used to broadcast messages between nodes (e.g., the broadcast command may be used to distribute interrupts). Finally, the sync info packet may be used for cases in which synchronization of the fabric is desired (e.g., error detection, reset, initialization, etc.).

Routing

In a distributed memory computing system such as the one described above, packets are routed both between and within nodes. A flow control scheme may handle routing between individual nodes. For example, in a coupon-based flow control scheme, the transmitting node may maintain a count of available buffers in the receiving node. Whenever the receiving node indicates that it has freed or used a buffer, the sending node may update the current buffer count. Whenever the buffer count indicates that all of the available buffers are filled, the transmitting node may stop sending packets in order to avoid overrunning the buffers in the receiving node.

Certain packets may logically conflict with other packets (e.g., for protocol reasons or coherency reasons). If a first packet logically conflicts with a second packet, a deadlock situation may arise if the second packet physically blocks the first packet's transmission (e.g., by occupying conflicting resources). In order to reduce the chance of deadlock, it may be desirable to structure communications so that packets that may logically conflict with each other may not experience physical conflicts with each other, and vice versa. One way to do this is to assign packets that may experience logical conflicts to different "virtual" communication channels and to implement the transmission medium so that the virtual channels may not experience physical conflicts with each other. It is noted that in some embodiments, packets from different virtual channels may be transmitted over the same physical links (e.g., lines 24 in FIG. 1).

If packets of the same type are unlikely to logically conflict with each other, each packet may be assigned to a virtual channel based upon its command encoding (see the command code column of FIG. 7 for examples). In one embodiment, packets may be assigned to one of four different virtual channels: broadcasts, requests, responses, and posted requests. The broadcast virtual channel includes packets that are sent to multiple destinations (e.g., as part of a transaction, probe packets may be sent to each node in the system in order to maintain cache coherency). Request packets include commands such as read or write commands that are not posted (i.e., the recipient of a request generates a response). Response packets include responses to request packets. Posted requests differ from non-posted requests in that recipients of posted requests may not generate responses (e.g., issuers of posted requests may not expect a response from the recipient of a posted request). For example, posted requests may be used in systems that support PCI (Peripheral Component Interconnect) posted writes. In general, requests cause responses and broadcasts to be issued in order to service the request and to indicate to the requester (for non-posted requests) that the request is complete. Responses may also return any data associated with the request. In this embodiment, some types of packets (such as the information packet illustrated in FIG. 3) are not routed once they are received. Since these types of packets are not routed, the routing system may be simplified by not assigning them to a virtual channel. However, these unassigned packets may still be transmitted over the same physical transmission medium as the other packets that have been assigned a virtual channel.

For simplicity, the four virtual channel embodiment described above will be referred to in most of the following description and examples. However, it is noted that other embodiments may choose different numbers and/or groupings of virtual channels, as desired. For example, one embodiment may not support posted requests. That embodiment may have three virtual channels (broadcasts, requests, and responses) instead of four. Other embodiments may have more than four virtual channels.

In order to avoid deadlock, the virtual channels may be structured to avoid resource conflicts with each other (i.e., one virtual channel may not be allowed to block another). For example, the request virtual channel may become blocked if a constant stream of requests all need to be transmitted to a full request queue in a memory controller. In order to service the entry at the head of the request queue, and thus free up room to accept a new request, the memory controller may need to be able to transmit responses and probes. Accordingly, to avoid deadlock, the stalled request virtual channel may not be able to block the response and/or broadcast virtual channels.

In addition to avoiding deadlock, there may be other concerns when routing packets in a distributed system. These concerns may include fairness (e.g., making sure each interface and/or virtual channel has access to the available bandwidth), performance (e.g., routing packets that were received earlier before those that were received later), and the complexity of the physical interconnections within each node.

Centralized Scheduler

A node may use a distributed buffering, centralized scheduling system in order to address some of these concerns. For example, each of the node's interfaces may have independent input buffers for each virtual channel, and packets may be routed using a centralized scheduler. In some embodiments, using a centralized scheduler may address fairness, starvation, physical routing, and performance concerns as follows. With respect to fairness and starvation, the centralized scheduling system may be configured to only route packets that have input buffers ready to receive them. If so, packets are scheduled based on their state of readiness, independently of which virtual channel they belong to or which interface received them. Since packets that are not ready to be routed (i.e., packets that do not have input buffers available at their destination) may not impact the scheduling process, virtual channels may not block each other. Similarly, since scheduling may be done independently of which virtual channel a packet belongs to and which interface received the packet, fairness may improve and the likelihood of starvation may decrease.

With respect to performance, the centralized scheduling system may track the relative age (i.e., how long ago each packet was received by the node) of each packet. Based on each packet's relative age, the centralized scheduling system may be configured to route older packets before younger packets. For example, once input buffers are available for a certain virtual channel at a certain destination, all of the packets in that virtual channel to that destination may become schedulable. Using the relative age of the packets in that virtual channel that are to be routed to that destination, the oldest of these packets may be identified, allowing the oldest packet to be routed first and consequentially improving performance.

Furthermore, if packets are buffered in distributed input buffers (i.e., one set of input buffers for each interface), the physical routing within a node may be improved. For example, packets may not be written into the centralized scheduler in many embodiments, simplifying the inputs to the scheduler. Similarly, in some embodiments, multiplexers may be used to provide packets to each output port, simplifying the physical routing within the node.

Figure 8:
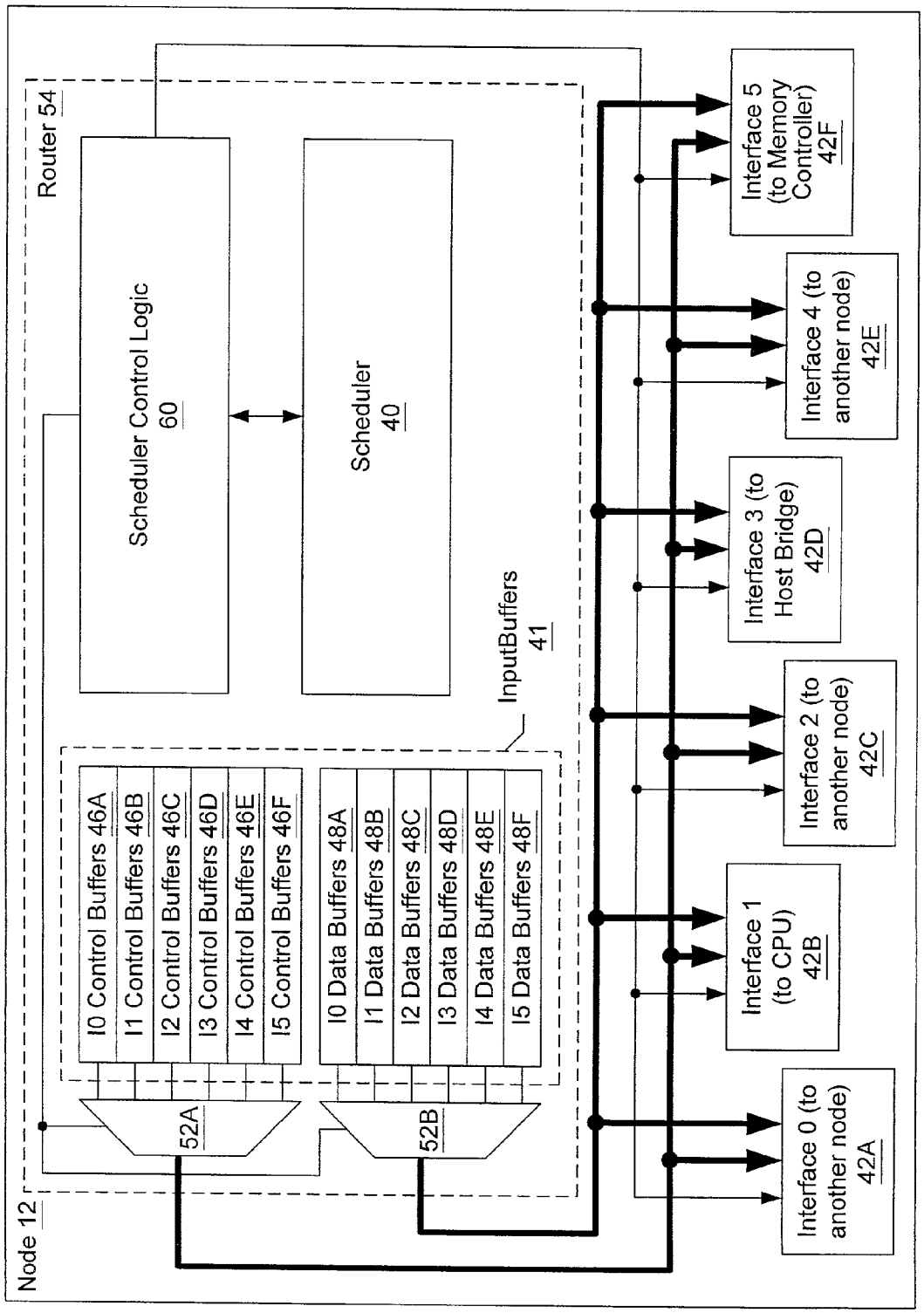
FIG. 8 illustrates one embodiment of a node.

FIG. 8 shows one embodiment of a node that includes a centralized scheduler with distributed packet buffers for each interface. Note that the actual physical arrangement of the interfaces and interconnections within the node may be significantly different than the logical interconnections shown in FIG. 8. In the illustrated embodiment, there are six interfaces 42A-42F (collectively referred to as interfaces 42). Each interface 42 may be configured to send and receive packets. Some of the interfaces, 42B, 42D, and 42F, may be coupled to a device (e.g., a CPU, host bridge, or memory controller) within the node. These interfaces receive packets generated by the device and send packets to the device to be processed. Other interfaces, 42A, 42C, and 42E, may be coupled to send packets to and receive packets from other nodes. Thus, Interface 1 (I1) 42B may be configured to send packets to a CPU for processing and to receive packets generated by the CPU, and Interface 0 (I0) 42A may be configured to send and receive packets from another node.

In the illustrated embodiment, each interface 42 may have an associated set of control buffers and an associated set of data buffers. For example, control and data packets received by interface 42A may be stored in control buffers 46A and data buffers 48A respectively. For simplicity, the collective set of control buffers 46A-46F will hereinafter be referred to as control buffers 46, and the collective set of data buffers 48A-48F will be referred to as data buffers 48. Generally, the control buffers 46 may store control packets to be routed (e.g., requests, responses, broadcasts, and posted requests). The data buffers 48 may store data packets that are associated with a particular command. Collectively, the control buffers 46 and data buffers 48 are referred to as input buffers 41. Each set of command and data buffers for each interface may include independent command and data buffers for each virtual channel (see FIG. 9). Alternatively, a combined set of command and/or data buffers may be shared between the virtual channels. In such an embodiment, the number of buffers allocated to each virtual channel may be programmably selected.

A router 54 uses the centralized scheduler 40 to route packets stored in the input buffers 41 to the various interfaces 42 within the node 12. The scheduler 40 may allocate an entry for each control packet that is currently stored in one of the control buffers 46 (part of routing a control packet may include routing an associated data packet, if there is one, so the scheduler may not include entries for each data packet). Each entry may contain information about its associated packet. The scheduler control logic 60 may use this information in the entries to determine which packet to route. For example, the scheduler control logic 60 may select an entry that corresponds to the next packet to be routed within the node. Once the scheduler control logic 60 selects an entry, the router 54 may generate appropriate control signals that cause the buffer 46 that is storing the packet corresponding to the selected entry to output the packet to the multiplexer 52A. If the selected entry also has an associated data packet, the router 54 may also generate signals that cause the buffer 48 storing the data packet to output the packet to the multiplexer 52B. The outputs of these two multiplexers (collectively referred to as multiplexers 52) may be provided to each interface 42. The router 54 may generate control signals that identify to which interface(s) 42 the selected packet is to be routed. In response to being identified by these signals, an interface 42 may receive the selected packet(s) from the multiplexers 52 and send the selected packet(s) to the node or device with which the interface communicates.

Like the sample packets in FIGS. 3-6, some packets may identify the node and unit (e.g., device) to which it is to be routed. This destination identification may identify the ultimate destination(s) of the packet (e.g., the memory controller in node X). In order to be able to handle a packet that is being routed through a node that is not its ultimate destination, each node may include a destination mapping unit (not shown) that contains information mapping each outside destination to an intra-node interface. For example, if the ultimate destination of a packet is within node A and the packet is currently being routed through node B, the destination mapping unit of node B may identify interface 42C, which communicates with an interface of node A (or another node through which the packet may pass to reach node A), as the proper intra-node destination for the packet. Accordingly, when each scheduler entry is allocated, the internal destination (as opposed to the ultimate, external destination) for each packet may be used as the destination in each scheduler entry.

In the illustrated embodiment, each interface 42 may be configured to only output a packet when the router 54 has identified that interface as the packet's recipient. For example, the router 54 may notify the interface 42B to accept the packet output by the multiplexer 52A. While the packet may be provided to each of the other interfaces, only interface 42B may accept the packet, since it is the only interface identified by the router 54 as the recipient. Once the packet is received by the interface 42B, the interface 42B may output the packet to the CPU, which may in turn process the packet according to the command in the packet. If there is an associated data packet, the data packet may be routed in a similar manner using a multiplexer 52B.

The multiplexers 52 may be used to ease the physical routing of interconnections between the interfaces 42. In some embodiments, each multiplexer 52 may represent multiple multiplexers (e.g., one for each interface 42). In these embodiments, the output of each of the multiple multiplexers 52 may only be routed to its corresponding interface (as opposed each multiplexer's output being routed to all of the interfaces). In one embodiment, using a routing scheme that has only one data path per interface may simplify the physical routing within the node.

Note that in the illustrated embodiment, only one control packet may be routed at a time. Other embodiments may allow different packets to be routed to each interface 42 at approximately the same time. For example, in one embodiment, there may be a control packet multiplexer (like multiplexer 52A) for each interface 42. In this embodiment, each time the router 54 performs a routing operation, the router 54 may identify a control packet that is to be provided to each multiplexer (if less than all of the interfaces have packets that are ready to be routed to them, no packets may be provided to some of the multiplexers). Since the interfaces 42 each have their own multiplexer, they may be configured to accept each packet provided from their particular multiplexer (as opposed to the illustrated embodiment, where each interface 42 depends on the router 54 to identify whether it is the intended recipient of a packet output from a shared multiplexer).

Figure 9:
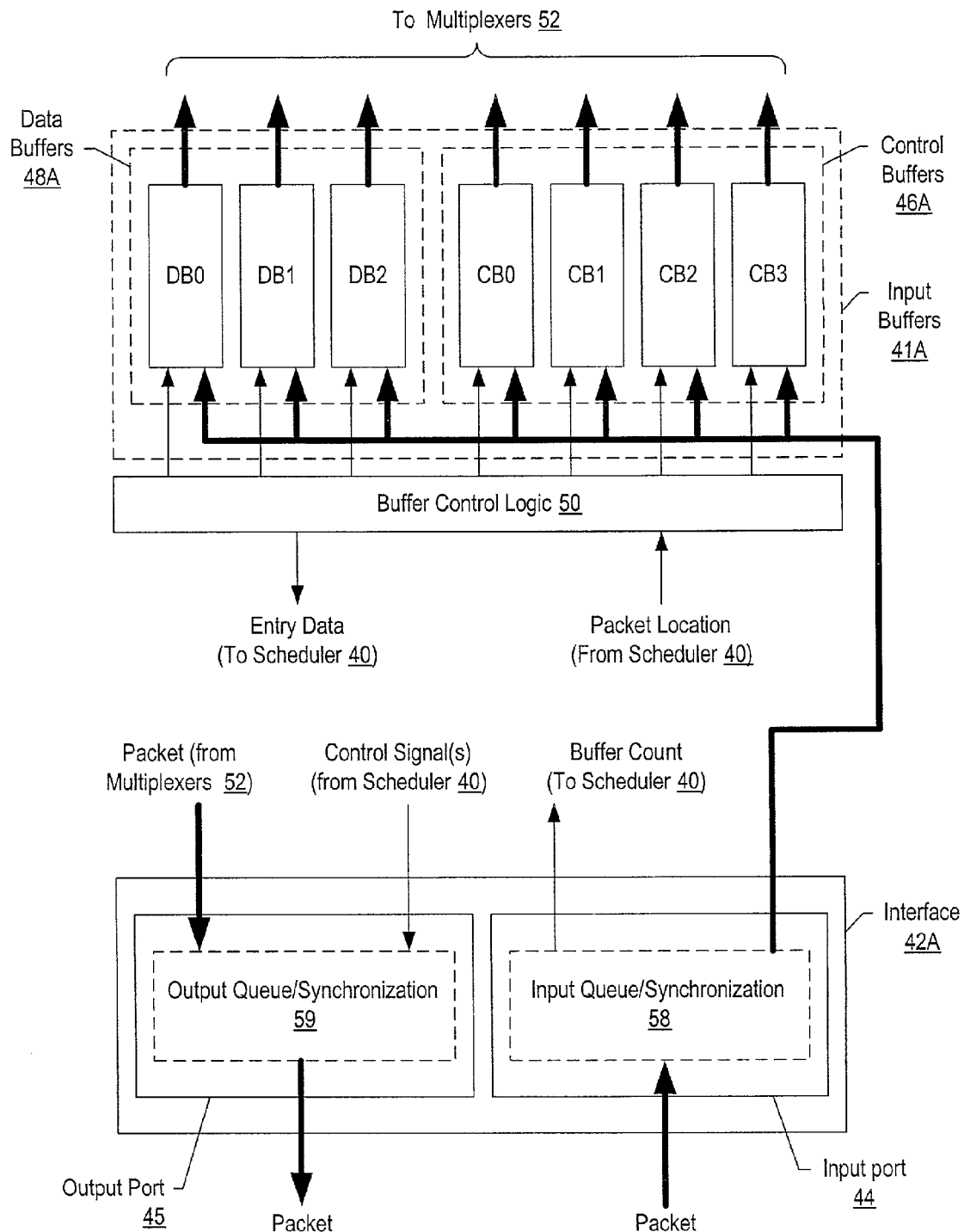
FIG. 9 illustrates one embodiment of input buffers that may be associated with an input interface of a node.

FIG. 9 shows one embodiment of interface 42A and the control and data buffers 46A and 48A associated with that interface (control and data buffers 46A and 48A are collectively referred to as input buffers 41A). Note that interfaces 42B-42F may have similar configurations to the configuration shown for interface 42A. In this embodiment, interface 42A may include an input port 44 that receives packets. These packets may be sent to the interface 42A by another node or generated by a device (e.g., a memory controller, CPU, or other such device) with which the interface 42A communicates. The input port 44 may include an input queue and/or synchronization circuitry 58 to temporarily buffer and/or to synchronize packets as they are received. For example, an input queue 58 may receive packets synchronized to a first clock from another node. Internally, the node may have a different clock (which may not be phase matched to the first clock), and the queue and/or synchronization logic 58 may synchronize intra-node transmission of the packet to the node's internal clock.

Upon receiving a packet, the input port 44 may store that packet in an appropriate one of the interface's input buffers 41A. Some packets (e.g., info packets) that are not routed to another interface within the node may not be stored in the input buffers 41A. For example, if an info packet containing an updated buffer count (for the node or device with which the interface 42A communicates) is received by the input port 44, the input port 44 may send the updated buffer count to the router 54 instead of storing the info packet in one of the input buffers.

Interface 42A may also include an output port 45. The output port 45 may receive packets output by the multiplexers 52 (in FIG. 8) and the control signal(s) generated by the router 54. Since the multiplexers' outputs may be provided to each interface (as shown in the embodiment of FIG. 8), the control signals may identify which interfaces are the actual recipients of the packet(s) being output by multiplexers 52. For example, the router 54 may have a separate line connected to each output port 45. If interface 42A is to send the packet provided by multiplexer 52A, the router 54 may generate an appropriate signal on the line being provided to interface 42A. Alternately, if the router 54 provides the same set of signals to all of the interfaces' output ports, the router 54 may assert signals identifying interface 42A. Like the input port 44, the output port 45 may include an output queue and/or synchronization logic 59.

As shown, interface 42A may have its own set of input buffers 41A. These input buffers 41A may be subdivided into control buffers 46A, which store control packets, and data buffers 48A, which store data packets. In some embodiments, control packets may be substantially smaller and may occur more frequently than data packets. Because of this size and frequency disparity, providing separate input buffers for control and data packets may allow buffer space to be used more efficiently. Thus, if a control packet that does not specify a data packet is received, no data packet buffer space may be allocated. Alternately, if a control packet that does specify a data packet is received, both control packet buffer space and data packet buffer space may be allocated. To increase efficiency, a larger number of relatively smaller buffers may be provided for control packets, while fewer, larger buffers may be provided for data packets.

Also, each set of control and data buffers may be subdivided into sets of one or more buffers for each virtual channel or, alternatively, shared between the virtual channels. In the illustrated embodiment, there are four sets of control buffers for four different virtual channels: request, posted request, response, and broadcast. Set CB0 may store requests, set CB1 may store responses, set CB2 may store posted requests, and set CB3 may store broadcasts. There are also three sets of data buffers for three different virtual channels: request, posted request, and response (in this embodiment, broadcast packets do not include data packets, so no broadcast data buffers are shown). Note that in other embodiments, broadcasts may have associated data packets.

The input buffers 41A may be controlled by buffer control logic 50. In response to the control packet being received by the input port 44 (or in response to a control packet being stored in one of the input buffers 41A by the input port 44), the buffer control logic 50 may send data identifying that packet to be included in an entry allocated in the scheduler 40. For example, the entry data may include the location of the packet within input buffers 41A (e.g., buffer 3 in set CB0), the virtual channel of the packet (e.g., request), whether the packet has an associated data packet and, if so, the location of that data packet (e.g., buffer 1 in set DB0), and the destination interface(s) (e.g., Interface 3) to which the packet is to be routed. As mentioned earlier, the destination specified in the packet header may identify a device in another node within the overall system (e.g., the memory controller in Node X) instead of a device within the node through which the packet is currently being routed. Accordingly, the buffer control logic 50 may be configured to access routing information that identifies which interface(s) the packet is to be routed to based on the packet's ultimate destination(s). This routing information may be used to specify the destination in that packet's entry in the scheduler.

The buffer control logic 50 may also be configured to receive signals from the router 54 identifying the location of a packet that has been selected to be routed. For example, if the router 54 identifies that the packet in the third buffer in set CB0 has been scheduled, the buffer control logic 50 may cause the input buffers 41A to output that packet to the multiplexer 52A.

Figure 10:
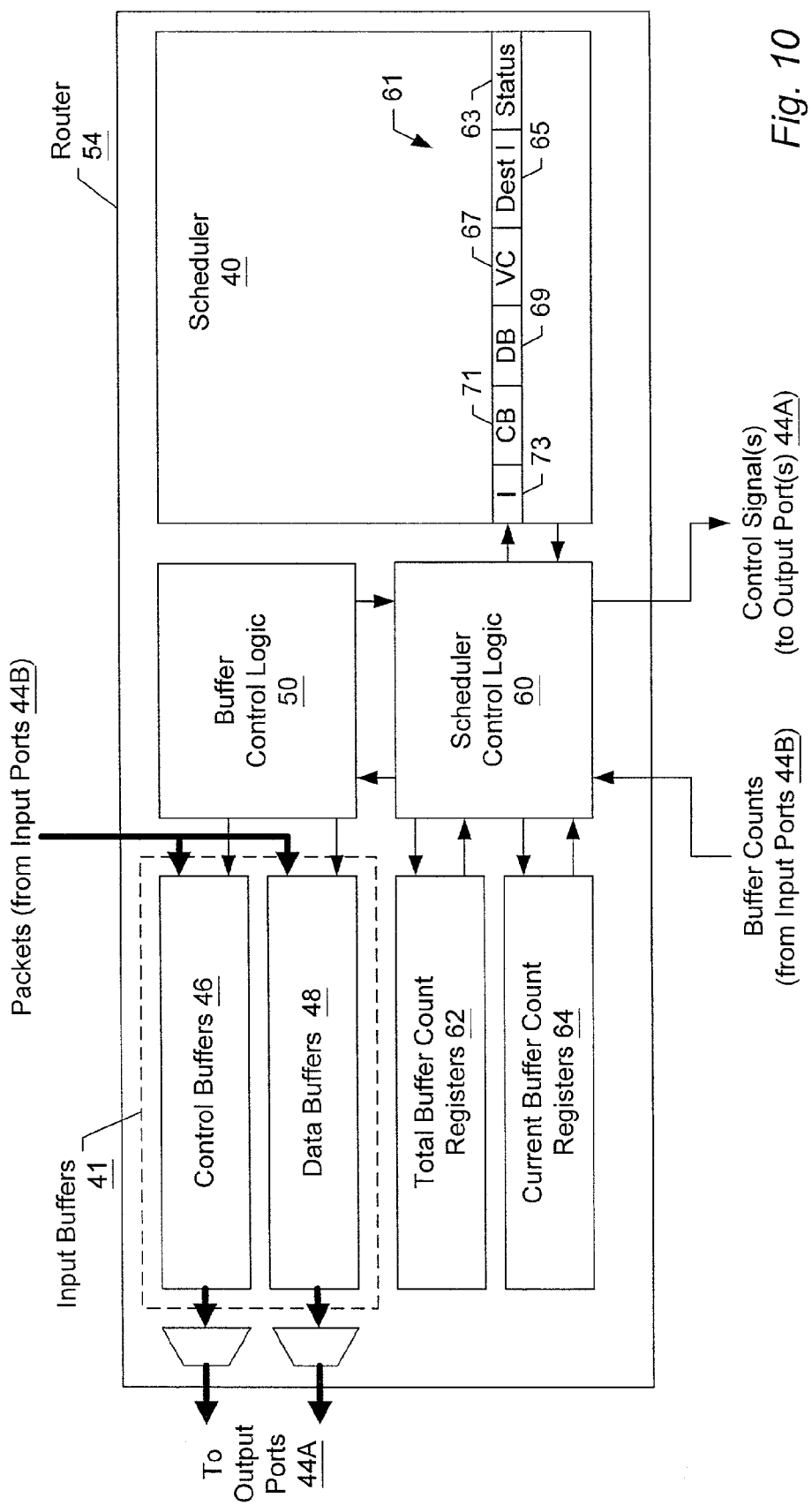
FIG. 10 illustrates one embodiment of a scheduler that may be included in a node.

FIG. 10 shows one embodiment of the router 54. The router 54 may logically be described as including the input buffers 41 and the buffer control logic 50 for each of the interfaces in the node (although these elements may be physically located within each interface 42). The router may also include several registers 62 and 64. These registers may be used to implement a coupon-based flow control scheme. For example, each of the registers 62 and 64 may store the number of total and currently used buffers at the node or device with which a respective one of the interfaces communicates. For example, some of the registers 62 that are associated with I4 may store the total number of input buffers for each virtual channel at the node with which I4 communicates, and some of the registers 64 that are associated with I4 may store the number of input buffers in each virtual channel that are currently being used at that node.

The scheduler control logic 60 may be coupled to receive updated buffer counts from the interfaces 42. For example, in a coupon-based system, the ability of each interface 42 to send a packet to the node or device with which it communicates may depend on whether the node or device that interface communicates with has input buffers available to receive the packet. In order to track how many buffers are available at each interface's destination, each interface may receive an updated buffer count after a packet stored in one of that interface's destination's input buffers is routed, since an input buffer is now available to store another packet from that interface. Each interface may then pass this updated buffer count to the scheduler control logic 60. In response to receiving an updated buffer count from one of the interfaces 42, the scheduler control logic 60 may update the value stored in the current buffer count register 64 for that particular virtual channel and interface. For example, whenever I4 receives an updated buffer count from the interface of the node it communicates with, I4's input port 44 may communicate that updated buffer count to the router 54, and in response, the scheduler control logic 60 may update the appropriate current buffer count register 64. The total and current buffer counts may be used to route packets within the node, since in this embodiment a packet may not be routed unless input buffers are available for it in its virtual channel and at its destination. For example, if a response packet's intra-node destination is I0, that response packet can be routed if the total number of response buffers (at the interface of the node with which Interface 0 communicates) exceeds the current number of response buffers being used.

Note than in other embodiments, the buffer counts may each be tracked using a single count register. For example, one of the buffer counts may be initialized to the total number of available buffers for the virtual channel and the interface that buffer count corresponds to. As buffers are filled and emptied, the buffer count may be respectively decremented and incremented to reflect the changes. When this buffer count equals zero, it may indicate that no buffers are currently available at that interface for that virtual channel.

As discussed briefly above, the router 54 may include a scheduler 40, which allocates an entry for each control packet stored in one of the input buffers 41. The scheduler control logic 60 may be configured to allocate an entry in the scheduler 40 in response to one of the interfaces 42 receiving a packet or storing a packet in one of the input buffers 41. In some embodiments, the scheduler control logic 60 may be configured to allocate each entry in the scheduler 40 at the top of the router 54. After an entry is selected and the packet corresponding to that entry is routed, the scheduler 40 may shift the entries that are newer than the selected entry down to fill the space vacated by the selected entry. This way, entries are shifted closer to the bottom of the scheduler to reflect the fact that they have become progressively older with respect to newer, higher entries. As a result, the relative ordering of entries in the scheduler 40 may be used to determine the relative age of each entry, allowing age to be used as a routing criterion.

The scheduler 40 may be configured to allocate an entry for each control packet that is to be routed within the node (i.e., each packet stored in one of the control input buffers 46). Each entry may include information identifying which interface received the packet (and thus which interface's input buffers are storing the packet), the buffer location where the packet (and its associated data packet, if there is one) is stored, the virtual channel of the packet, the destination interface of the packet, and whether the packet has an associated data packet. Each entry may also identify which control buffer the packet is stored in (and, if there is an associated data packet, which data buffer the associated data packet is stored in). In some embodiments, the scheduler control logic 60 may be configured to pipeline scheduling and each entry may include a status bit identifying whether the entry is in the pipeline (i.e., is already being scheduled). FIG. 20A shows a pipelined embodiment in more detail. Additional entry information may also be included.

Figure 21:
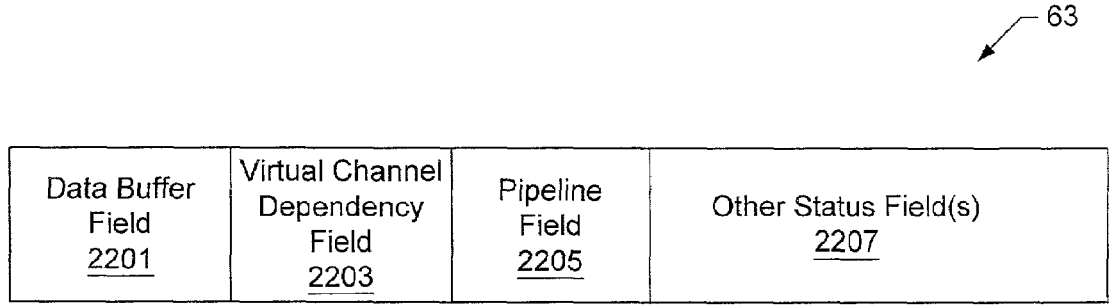
FIG. 21 shows one embodiment of the status field of an entry.

An exemplary entry 61 is illustrated within scheduler 40 in FIG. 10. In this embodiment, an entry 61 may have six fields: I, CB, DB, VC, Dest I, and Status. The I field 73 may store a value identifying which interface originally received the packet corresponding to the entry 61. The CB field 71 may identify which of that interface's command buffers is storing the packet. The DB field 69 may indicate which of that interface's data buffers, if any, is storing the data packet that corresponds to the packet. If there is no data packet associated with a particular entry, the DB field 69 for that entry may be set to a certain value indicating that there is no data packet instead of being set to a value identifying a data buffer. The VC field 67 may identify which virtual channel the packet is traveling in. The Dest I field 65 may identify which interface(s) the packet is to be routed to. The Status field 63 may indicate whether the entry 61 is valid and/or whether the entry is already being scheduled (e.g., in embodiments where scheduling is pipelined). One embodiment of a status field 63 is shown in FIG. 21. Other entries with differing types and/or numbers of fields may be used in other embodiments.

In FIG. 21, one embodiment of a scheduler entry's status field 63 is illustrated. In this embodiment, the status field 63 may include a data buffer field 2201 that indicates whether the packet that corresponds to the entry has an associated data packet or not. Additionally, if the packet does not have an associated data packet but should be ordered behind another packet that does have a data packet, the data buffer field 2201 may be set to indicate that the packet should not be routed until a data buffer is available. Thus, the data buffer field 2201 may also be set to a certain value to satisfy an ordering requirement. The virtual channel dependency field 2203 may be used to indicate that the packet corresponding to the entry has an ordering requirement with respect to another packet in a different virtual channel. For example, the virtual channel dependency field 2203 may be set to a certain value to indicate that the corresponding packet should not be routed unless a control buffer is available in the posted request virtual channel. The pipeline field 2205 may be a single bit or a series of bits whose value(s) indicate whether a corresponding entry is currently being scheduled in a pipelined embodiment of a scheduler. Other status fields 2207 (e.g., a field that indicates whether the entry is valid) may also be included in each entry in some embodiments. Note that in some embodiments, the status field may include fewer than all of the fields shown in FIG. 21.

In some embodiments, the entry information for a particular packet may be significantly smaller than the packet it describes. This may reduce the size of the scheduler 40. For example, in one embodiment, control packets may be 64 bits and data packets may be up to 64 bytes. Each control buffer may therefore store at least 64 bits and each data buffer may store 64 bytes. In contrast, a 20-bit entry may be able to specify relevant routing information for each control packet. Accordingly, a scheduler entry may be significantly smaller than the actual packet it corresponds to. However, it is noted that in some embodiments, the entries may be nearly as large as, or even as large as, the packets they describe.

Which entry is selected may depend, in part, on flow control information related to the packet. For example, in a coupon-based flow control scheme, a packet may not be routed until an input buffer is available to receive that packet. When an entry corresponds to a packet that also specifies a data packet, the corresponding packet may not be routed until both a data buffer and a control buffer are available in that packet's virtual channel. Thus, the total and current buffer counts stored in the registers 62 and 64 may be used to determine which of the entries in the scheduler 40 are ready to be scheduled (i.e., which entries have an input buffer available at their destination). For example, if an entry in the request virtual channel is to be routed to I2, that entry will be ready to be scheduled when the interface at the node with which I2 communicates has an input buffer available in the request virtual channel. Thus, if the buffer count registers indicate that the interface has request buffers available, the entry may be scheduled. Because buffer availability may vary over time, entry readiness may be recalculated for each scheduling attempt. Since packets that are not ready to be routed (e.g., packets that do not have input buffers available at their destination) may not impact the scheduling process (e.g., they are not considered ready and are thus ignored during entry selection), virtual channels may not block each other. Similarly, since packets may be routed independently of which interface received each packet, fairness may improve and the likelihood of starvation may decrease.

Once entry readiness has been calculated, the scheduler control logic 60 may be configured to select the oldest entry that is currently ready to be scheduled. In some embodiments, the relative arrival time, or age, of a packet may be determined from the relative location of the entry corresponding to the packet in the scheduler 40. In these embodiments, the scheduler control logic 60 may be configured to scan from the oldest entry towards the youngest entry when looking for a "ready" entry so that the oldest ready entry is selected each time.

Once an entry has been selected from the scheduler 40 and the packet corresponding to that entry has been output from the input buffers 41 to the appropriate destination interface 42, the entry may be deleted from the scheduler 40. In one embodiment, each entry may include a validity indication, and an entry may be deleted by modifying the validity indication to indicate that the entry is no longer valid. In embodiments where the relative placement of entries in the scheduler 40 indicates the relative age of the entries, an entry may be deleted by shifting younger entries down towards the bottom of the scheduler 40, thus making room for newer entries at the top of the scheduler 40.

Figure 11:
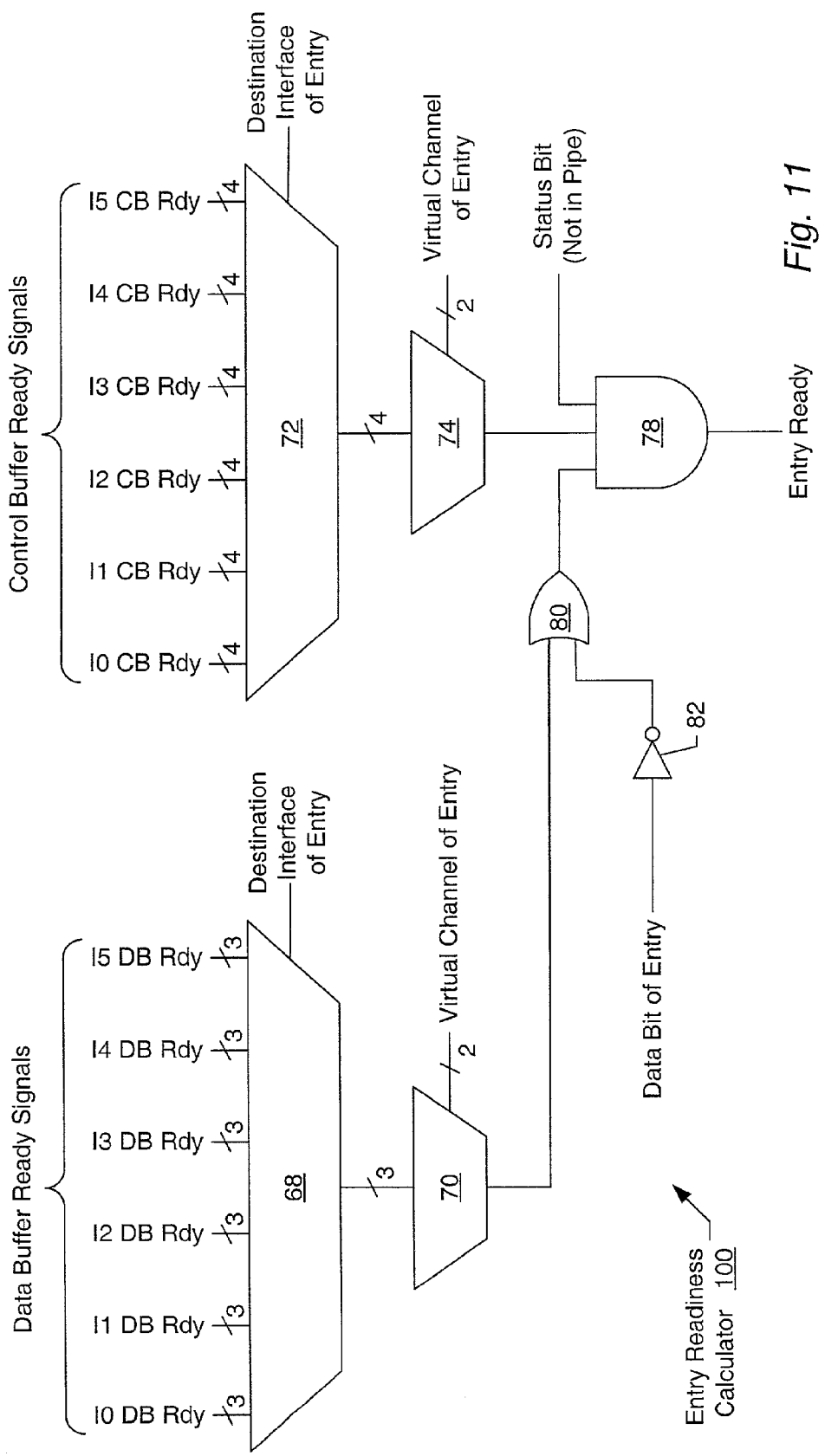
FIG. 11 illustrates one embodiment of logic that may be used to determine whether a scheduler entry is ready to be scheduled.

FIG. 11 shows one embodiment of a circuit 100 for calculating entry readiness for a single entry in the scheduler 40. Other embodiments may achieve similar functionality using different hardware configurations. The scheduler control logic 60 may have an entry readiness calculator 100 for each entry in the scheduler 40. In this embodiment, entry readiness is calculated based on whether control (and, if appropriate, data) buffers are available to receive the packet identified by the entry, and the entry ready signal is asserted if the entry is ready to be scheduled (i.e., if all inputs to the AND gate 78 are asserted).

The multiplexer 72 receives control buffer ready signal(s) that correspond to each of the six interfaces (I0-I5). In this embodiment, there are four virtual channels, so each interface's control buffer ready signals may include one signal per virtual channel. These control buffer ready signals may be determined from the current and total buffer counts (e.g., the values stored in registers 64 and 62 in FIG. 10). For example, each of Interface 0's control buffer ready signals may be asserted if there are control buffers available for each virtual channel that the node Interface 0 transmits packets to. Alternately, if only one virtual channel has control buffers available, only that one of Interface 0's control buffer ready signals may be asserted. For a more detailed example of one embodiment of the control buffer ready signals, see FIG. 20B.

The destination interface specified in the entry may be used as the input to the multiplexer 72. Based on the destination interface, the relevant control buffer ready signals may be selected. For example, if an entry's destination interface is I5, I5's control buffer ready signals may be selected by the multiplexer 72. Likewise, the entry's virtual channel is used as the input to the multiplexer 74, which selects the relevant control buffer ready signal based on the entry's virtual channel.

If the packet corresponding to a particular entry has an associated data packet, the entry may include an indication that a data packet is also to be routed. For example, in this embodiment, each entry may include a bit that indicates whether a data packet is to be routed. If the bit is set, that may indicate that there is an associated data packet. In order to route both a control and data packet, both control and data buffers should be available. Thus, when there is an associated data packet, the multiplexers 68 and 70 may be used to determine whether there are data buffers available. Like the multiplexers 72 and 74 select the appropriate control buffer ready signals, the multiplexers 68 and 70 select the appropriate data buffer ready signals based on the destination interface and virtual channel specified in the entry. The inverter 82 and the OR gate 80 may be used so that data buffer readiness is only considered for entries that have associated data packets.

In embodiments where scheduling is pipelined, it may be inefficient to allow an entry that is already being scheduled to be selected again. As a result, each entry may also include an indication of whether that entry is already in the pipeline. For example, in the illustrated embodiment, the indication is a status bit that is set if the entry is not already being scheduled (this bit may be set when each entry is allocated). If the entry is already being scheduled, the status bit may be cleared, causing the entry ready signal to be deasserted. In another embodiment, each entry may include several status bits that indicate which pipeline stage, if any, the entry is currently in (e.g., all of the status bits may be cleared when the entry is not in the pipeline, then when the entry enters the pipeline, a first bit may be set, and as the entry proceeds through the pipeline, this bit may be shifted, reflecting that the entry has proceeded to other pipeline stages). In one such embodiment, the logical OR of the various status bits may be used to determine whether the entry is currently being scheduled.

Thus, the entry readiness calculator 100 shown in FIG. 11 determines entry readiness for a single entry based on whether the entry is already being scheduled, whether the entry indicates that both a data and control packet are to be routed, and whether the required input buffer(s) are available in the entry's virtual channel at the entry's destination.

Since there may be entry readiness calculators 100 for each entry in the scheduler 40, entry readiness may also depend on whether a valid entry is currently allocated in each particular entry location. In one embodiment, the status bit that indicates whether an entry has already entered the pipeline may be cleared for an invalid entry, causing the entry readiness calculator 100 to deassert the entry ready signal and preventing the invalid entry from being scheduled.

Alternately, if younger entries are shifted to fill in the location vacated by a scheduled entry, the scheduler control logic 60 may maintain a pointer to the topmost valid location in the schedule 40. This pointer may be used to allocate new entries at the top of the scheduler 40 as packets are stored in the input buffers. Additionally, this pointer may indicate the final entry for which entry readiness is to be considered by the scheduler control logic 60 so that invalid entries are not inadvertently scheduled.

Figure 12:
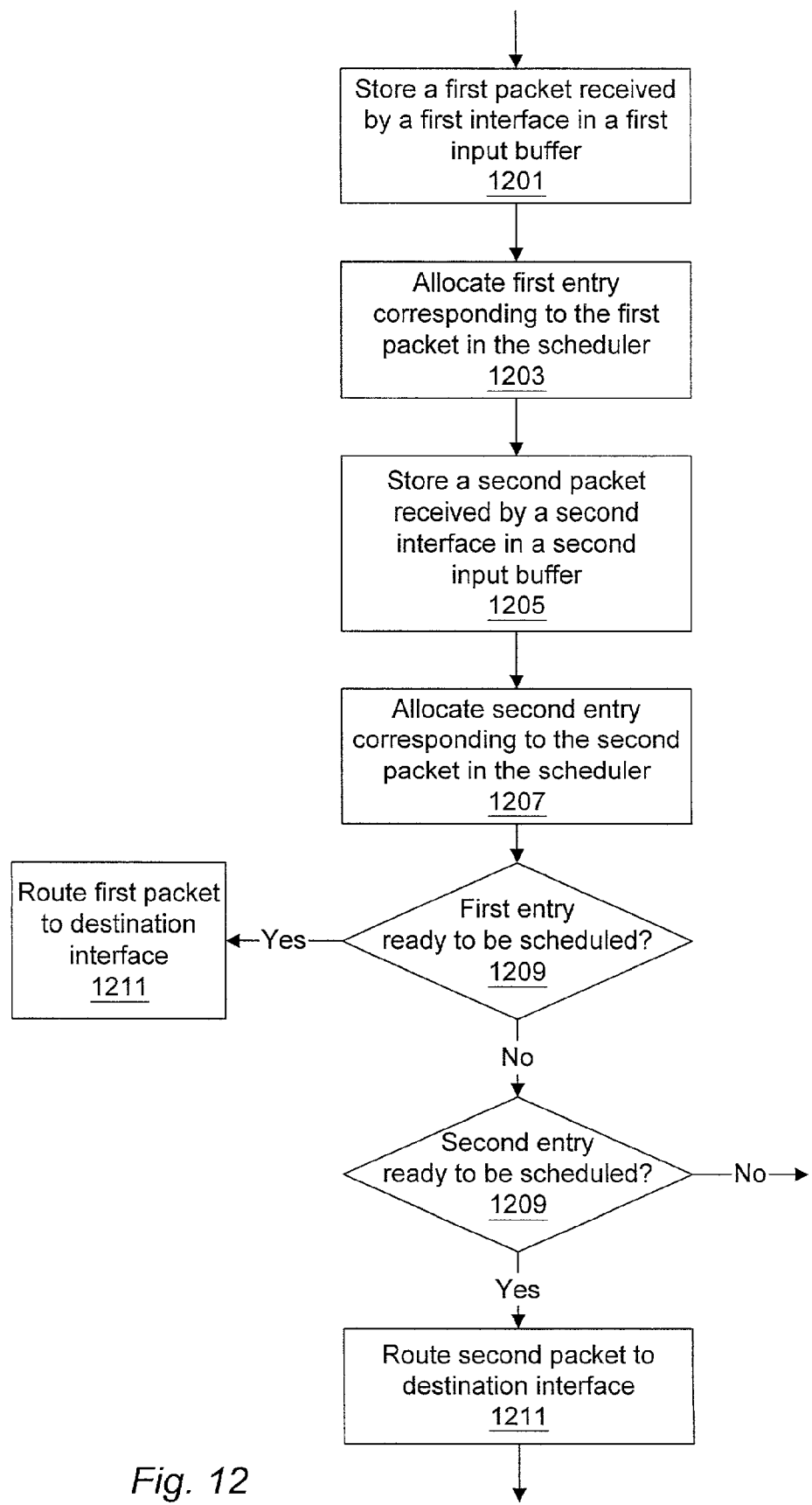
FIG. 12 is a flowchart illustrating one embodiment of a method of routing packets within a node.

Turning now to FIG. 12, a method of routing packets within a node is shown. At 1201, a first packet is received by a first interface of a node. This first interface may communicate packets to and from another node or to and from a device such as a memory controller. The first packet is stored in a first input buffer, also shown at 1201. At 1203, in response to the first packet being received, an entry corresponding to the first packet may be allocated in a scheduler. A second packet may be received by a second interface and stored in a second input buffer, as shown at 1205. In response, a second entry corresponding to the second packet may be allocated in the scheduler, as indicated at 1207. Assuming the first packet was received before the second packet and that no older entries are ready to be scheduled, if the first entry is ready to be scheduled, the first packet may be routed to its destination interface within the node (regardless of the readiness of the younger, second entry). An entry may be ready to be scheduled if, for example, flow control information associated with the entry indicates that buffers are available to receive the packet associated with the entry at the node or device with which the destination interface communicates. If the first entry is not ready to be scheduled but the second entry is, the second packet may be routed to its destination interface. Thus, a younger packet that is ready to be scheduled may be routed if none of the older packets are ready.

Ordered Routing

In some embodiments, there may be certain temporal dependencies between packets in the same virtual channel. Normally, if a system routes older packets before younger packets, any temporal order between packets will tend to be maintained. Furthermore, if there are no dependencies, it may benefit performance to rearrange the order of packets that have different scheduling requirements (e.g., a packet that needs an available control buffer to be routed may be allowed to pass another packet that needs both a control and a data buffer to be available to be routed). However, when dependencies do exist, rearranging the order may produce an undesired result, such as a read request accessing stale data. Also, if order is maintained during routing, performance may be improved since sending devices may be designed to send multiple packets without waiting for a response to each packet before sending the next.

One approach to ordering packets within a virtual channel may use the existing flow control scheme (e.g., the control and data buffer ready signals) to maintain proper ordering within a virtual channel. For example, if packet A is a write request and has an associated data packet and packet B is a read request that targets the same address as the write request of packet A, routing packet B before packet A may result in the read accessing stale data. Thus, packet B has the ordering requirement that it should not be scheduled before packet A. In order to keep the read behind the write, the scheduler control logic may modify the entry for packet B so that it has the same scheduling requirements (e.g., the conditions that should be met before its entry is ready to be scheduled) as the entry for packet A. For example, since the packet A's entry's readiness depends on both a control and a data buffer being available, packet B's entry may be modified to have the same scheduling requirements by setting the bit that indicates that there is an associated data packet. As a result of setting the data bit for packet B's entry, the entry readiness calculator may not indicate that packet B's entry is ready to be scheduled until both a data and a control buffer are available. As a result, both packet A's and packet B's entries will be ready at the same time, and since packet A's entry is older, packet A may be scheduled first. Thus, by forcing packet B to wait for a data buffer to become available (even though routing packet B will not actually use the data buffer), proper ordering may be maintained. Note that if each entry also includes a pointer to the buffer holding the data packet (if there is one), an entry whose data bit was set to meet an ordering requirement may have a null pointer instead of a pointer to a data buffer, since there is not actually a data packet to be routed.

In order to detect situations where packets within a virtual channel have ordering requirements with respect to each other, the router may contain additional comparators (e.g., to compare the addresses of read and write commands in request packets as entries are allocated). In some embodiments, a packet may contain the relevant ordering information (e.g., commands and/or dedicated fields that indicate ordering).

Figure 13:
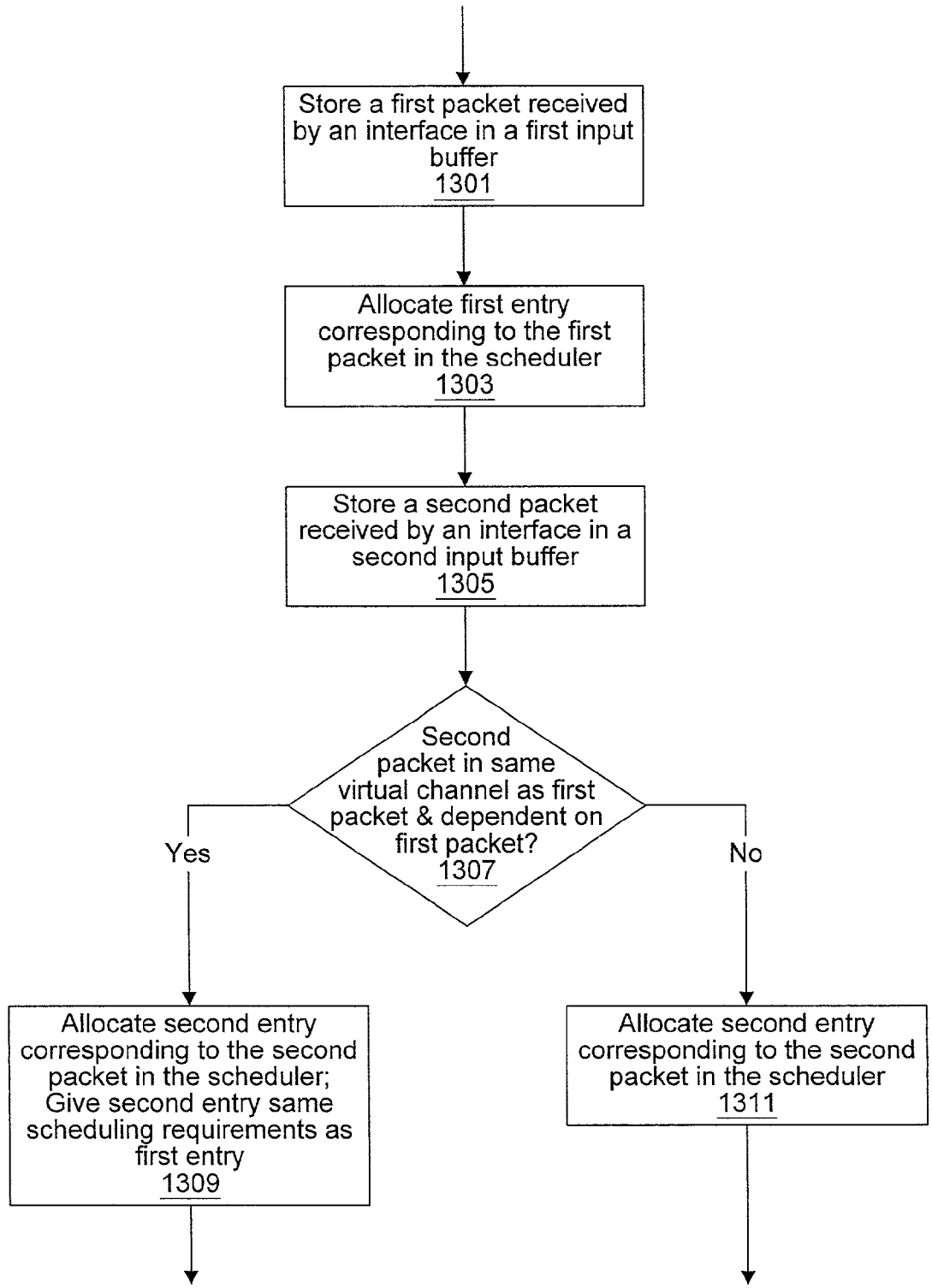
FIG. 13 is a flowchart illustrating one embodiment of a method of allocating scheduler entries in order to maintain the temporal order of packets within the same virtual channel.

FIG. 13 shows one embodiment of a method for allocating scheduler entries for packets when packets in the same virtual channel have ordering requirements with respect to each other. In step 1301, a first packet is received by one of the node's interfaces and stored in a first input buffer. An entry corresponding to the packet is allocated in the scheduler at 1303. At 1305, a second packet is later received by one of the interfaces (which could be the same interface that received the first packet). If this second packet is in the same virtual channel as the first packet and is dependent on the first packet in such a way that it should be scheduled after the first packet, this ordering requirement may be met by including the same scheduling requirements in the second entry as in the first entry, as shown at 1309. For example, if the first entry shows that both a control packet and a data packet are to be routed, the first entry will not be ready until both a control and a data input buffer are available. By giving the second entry the same scheduling requirements (i.e., indicating that both a control and a data input buffer should be available in order for the entry to be ready), the second entry may not be scheduled until after the first entry, assuming the router is configured to select older entries before younger entries. This scheme uses the existing flow control information and entry readiness calculators to maintain the proper ordering within a virtual channel.

Ordering requirements may also arise between packets in different virtual channels. Some of these ordering requirements may arise due to the particular nature of posted requests. For example, a posted write (in the posted request virtual channel) issued before a read request to the same address (in the request virtual channel) should be routed before the read request in order to prevent the read from accessing stale data. However, the readiness for the entry for the posted write depends on the availability of buffers in the posted request virtual channel while the readiness of the entry for the request depends on the availability of buffers in the request virtual channel. As a result, a system using an entry readiness calculator such as the one shown in FIG. 11 may inadvertently schedule the read request before the write if there are buffers available for requests before buffers are available for posted requests. Similarly, if a posted write updates data and sets some sort of semaphore to indicate that the data was updated, later reads that see the semaphore (which may travel in the response channel) should not pass the posted write that updates the data.

When ordering requirements exist between packets in different virtual channels, additional modifications may be made to certain entries in the scheduler in order to satisfy these ordering requirements. For example, if a packet in the response virtual channel is to be scheduled behind a posted write request in the posted request virtual channel, the entry for the response packet may be modified so that it indicates its dependency on the posted request virtual channel. In one embodiment, such an indication may be an additional status bit that is set if a particular packet depends on the posted request virtual channel. In order to consider this additional dependency when calculating entry readiness, entry readiness calculators like the ones shown in FIGS. 14 and 15 may be used.

Figure 14:
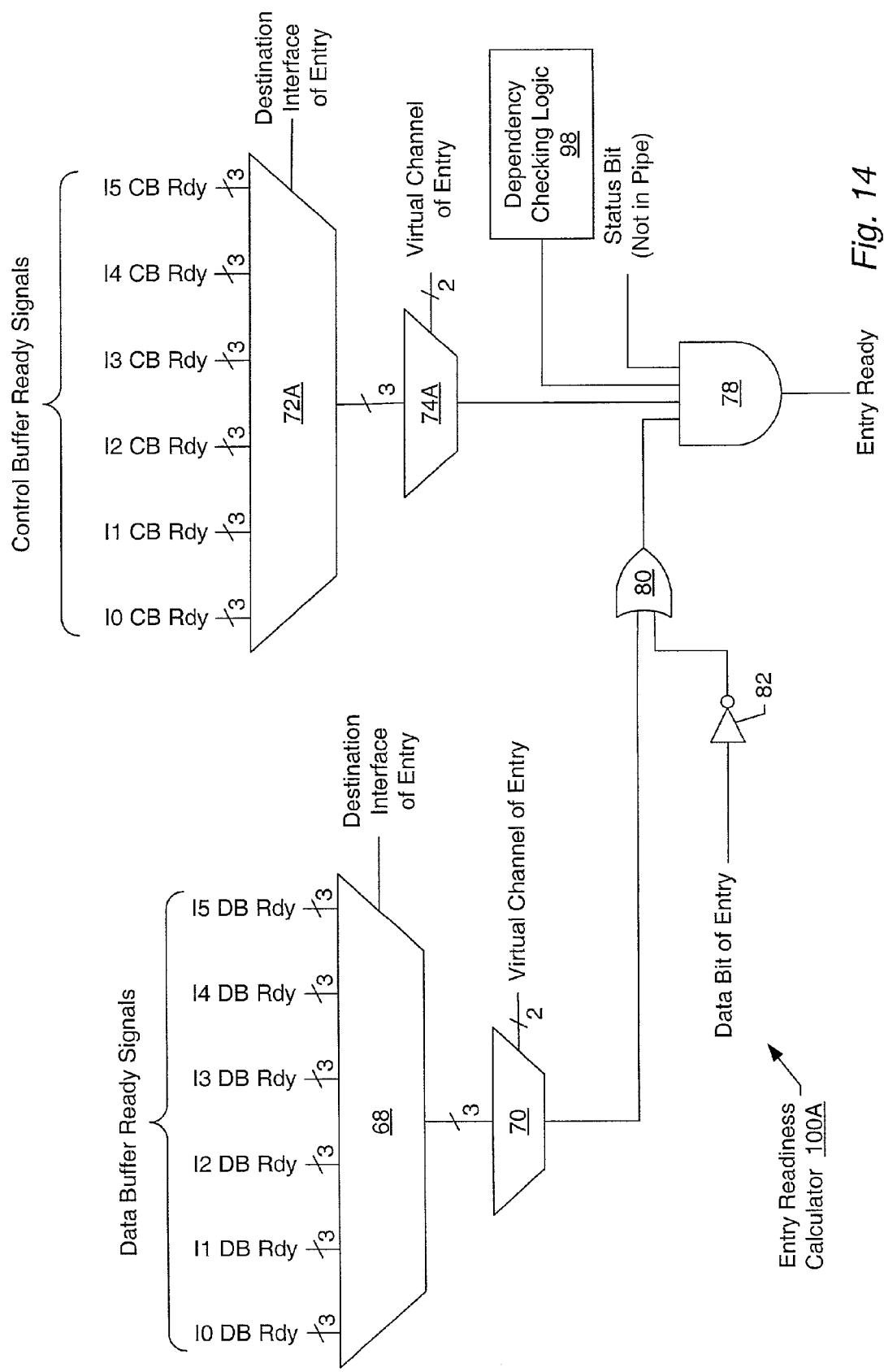
FIG. 14 illustrates another embodiment of logic that may be used to determine whether a scheduler entry is ready to be scheduled.

The entry readiness calculator 100A shown in FIG. 14 is similar to the entry readiness calculator 100 shown in FIG. 11. However, to handle situations where the packet corresponding to the entry should not be routed until a packet in the posted request virtual channel has been routed, this embodiment of a readiness calculator 100A includes dependency checking logic 98. In this embodiment, if the output of the dependency checking logic is deasserted, the entry ready signal may not be asserted.

Figure 15:
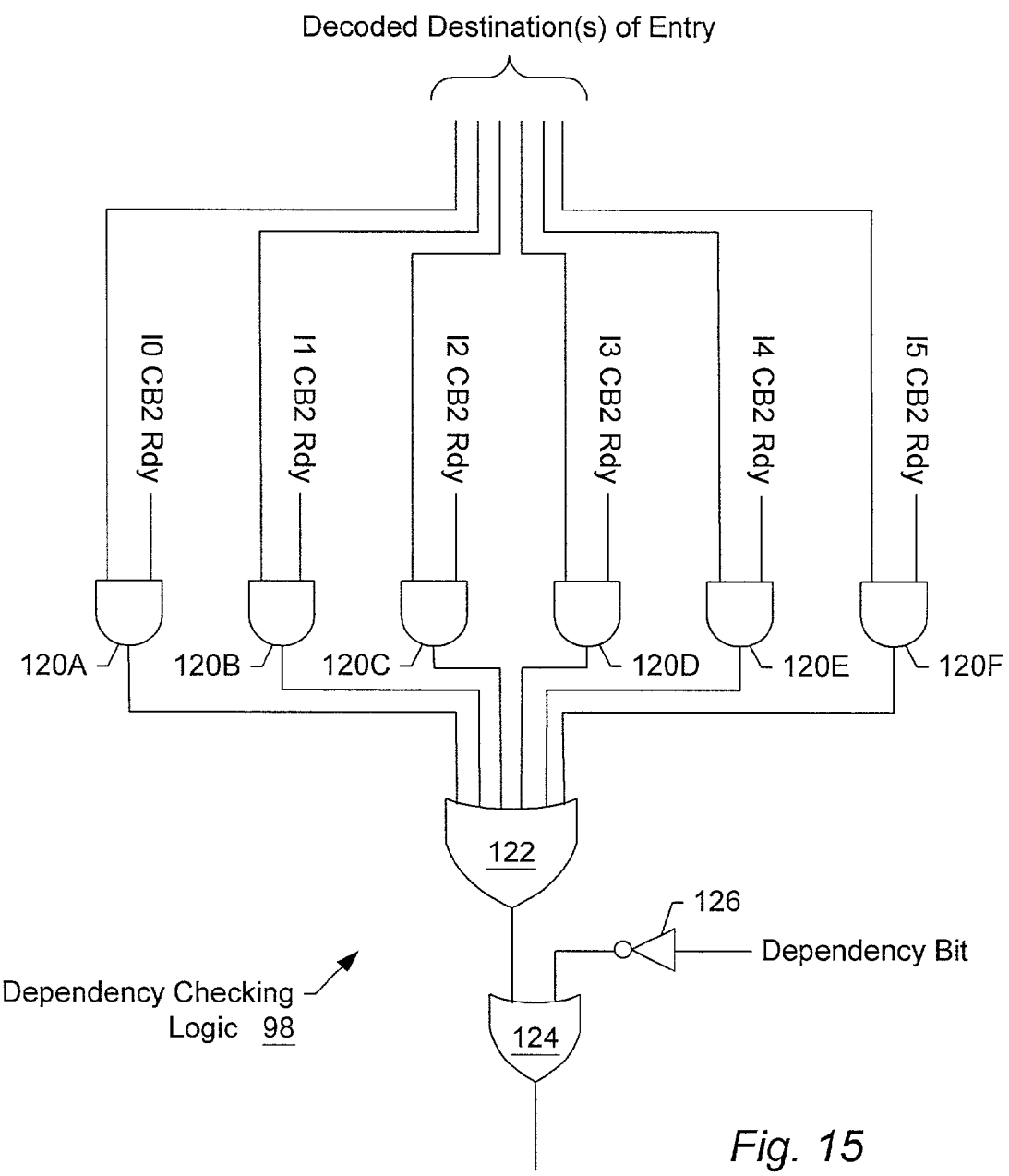
FIG. 15 illustrates another embodiment of logic that may be used to determine whether a scheduler entry that depends on an entry in another virtual channel is ready to be scheduled.

Turning to FIG. 15, one embodiment of the dependency checking logic 98 is shown in more detail. The dependency checking logic 98 shown includes several AND gates 120 which receive as inputs control buffer ready signals (for CB2, which is the posted request control buffer) for each interface and the respective decoded destination signals for the entry. The decoded destination signals effectively select the appropriate control buffer ready signals, since control buffer ready signals at interfaces other than the destination will be ignored. Note that in an alternative embodiment, gates 120 and 122 may be replaced with a MUX configured to select a control buffer ready signal based on the destination of the packet.

The dependency status bit is also an input to the dependency checking logic 98. Thus, if the dependency status bit is cleared (indicating that there is no dependency on the posted request virtual channel), the output of the dependency checking logic 98 will be asserted (and thus have no effect on entry readiness). Accordingly, looking back at FIG. 15, if an entry does not depend on the posted request virtual channel, the entry ready signal may only depend on the availability of buffers in the virtual channel of the entry. If instead the dependency status bit is set (indicating that there is a dependency on the posted request virtual channel), the outputs from the AND gates 120 will be used to determine if there are buffers available in the posted request virtual channel. If no buffers are available, the entry ready signal will be zero for the entry, preventing the packet corresponding to the entry from being scheduled.

Note that while the embodiment shown in FIGS. 14 and 15 checks for a dependency on the posted request virtual channel, other embodiments may check for dependencies on other virtual channels. Furthermore, one embodiment may check for dependencies on multiple different virtual channels. For example, in one embodiment, each entry may have a decoded virtual channel field, so that multiple virtual channels may be specified for each entry, and the entry readiness calculators may be modified to detect multiple dependencies and to assert the entry ready signal if those dependencies are satisfied.

Figure 16:
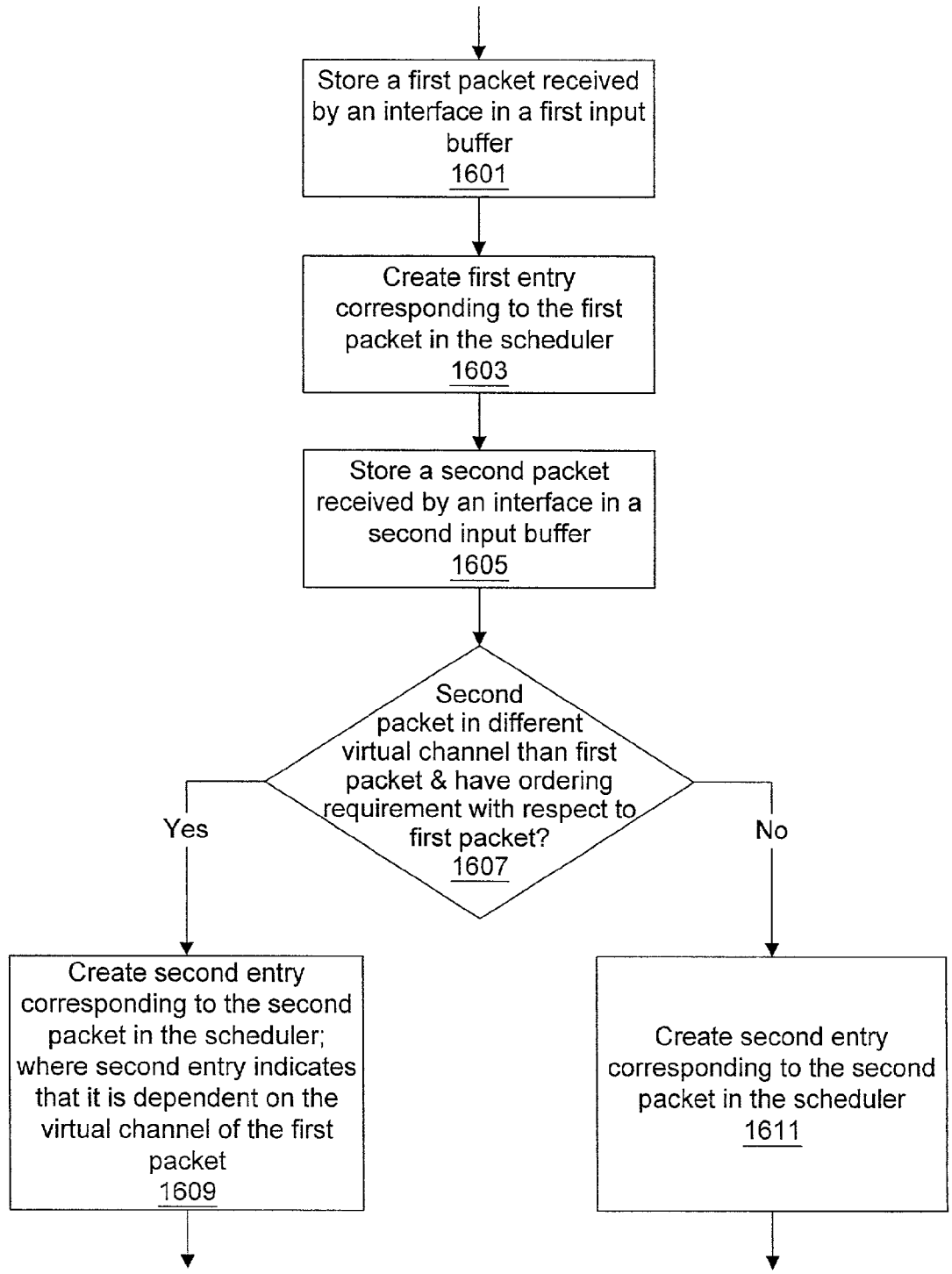
FIG. 16 is a flowchart of another embodiment of a method of routing packets within a node.

FIG. 16 shows one embodiment of a method of allocating a scheduler entry for a packet received by a node when the packet has an ordering requirement with respect to another packet in the posted request virtual channel. At 1601, a first packet in the posted request virtual channel is received and at 1603, a scheduler entry for that packet is allocated. A second packet is received at 1605. If the second packet does not have an ordering requirement with respect to the first packet, a scheduler entry for the second packet may be allocated, as shown at 1611. This entry may show the second packet's scheduling requirements (such as which virtual channel it belongs in and whether or not it has an associated data packet). If the second packet does have an ordering requirement with respect to the first packet and the second packet is not in the posted request virtual channel, the scheduler entry for the second packet may indicate the second packet's ordering requirement so that the second packet will be scheduled behind the first packet, as indicated at 1609. For example, each entry may include the same scheduling requirements as the first packet (e.g., the need for a control buffer to be available in the posted request virtual channel in order for each entry to be ready to be scheduled) in addition to its own scheduling requirements (e.g., the need for a control buffer to be available in each entry's own virtual channel). Whenever a packet should be scheduled after a packet in the posted request virtual channel, this field may be modified. As a result of modifying the field, the second entry may not indicate that it is ready to be scheduled unless both its scheduling requirements and the scheduling requirements of the first packet have been met. Since both packets' entries indicate readiness at the same time, the older first packet may be selected from the scheduler before the younger second packet, and the ordering requirement may be satisfied.

Broadcast Routing

As mentioned earlier, packets in the broadcast virtual channel may have more than one destination. Various embodiments may support multiple-destination packets in the broadcast virtual channel in different ways. For example, in one embodiment, when a broadcast packet has four destination interfaces, four entries that each specify a different one of the destinations may be allocated in the scheduler. This embodiment may be compatible with the entry readiness calculator 100 shown in FIG. 11.

Another embodiment may handle broadcast packets that have multiple destinations by allocating entries with decoded destination fields. For example, if a packet is to be routed to I0, I3, and I4, the destination field in the entry corresponding to that packet may be 100110 (assuming six interfaces in a node and that the decoded destination represents the interfaces in the order I0-I5 from left to right). There are several different ways to handle routing in embodiments like this. For example, in one embodiment, a broadcast packet may not be routed until each destination has a buffer available to receive the broadcast packet.

Figure 17:
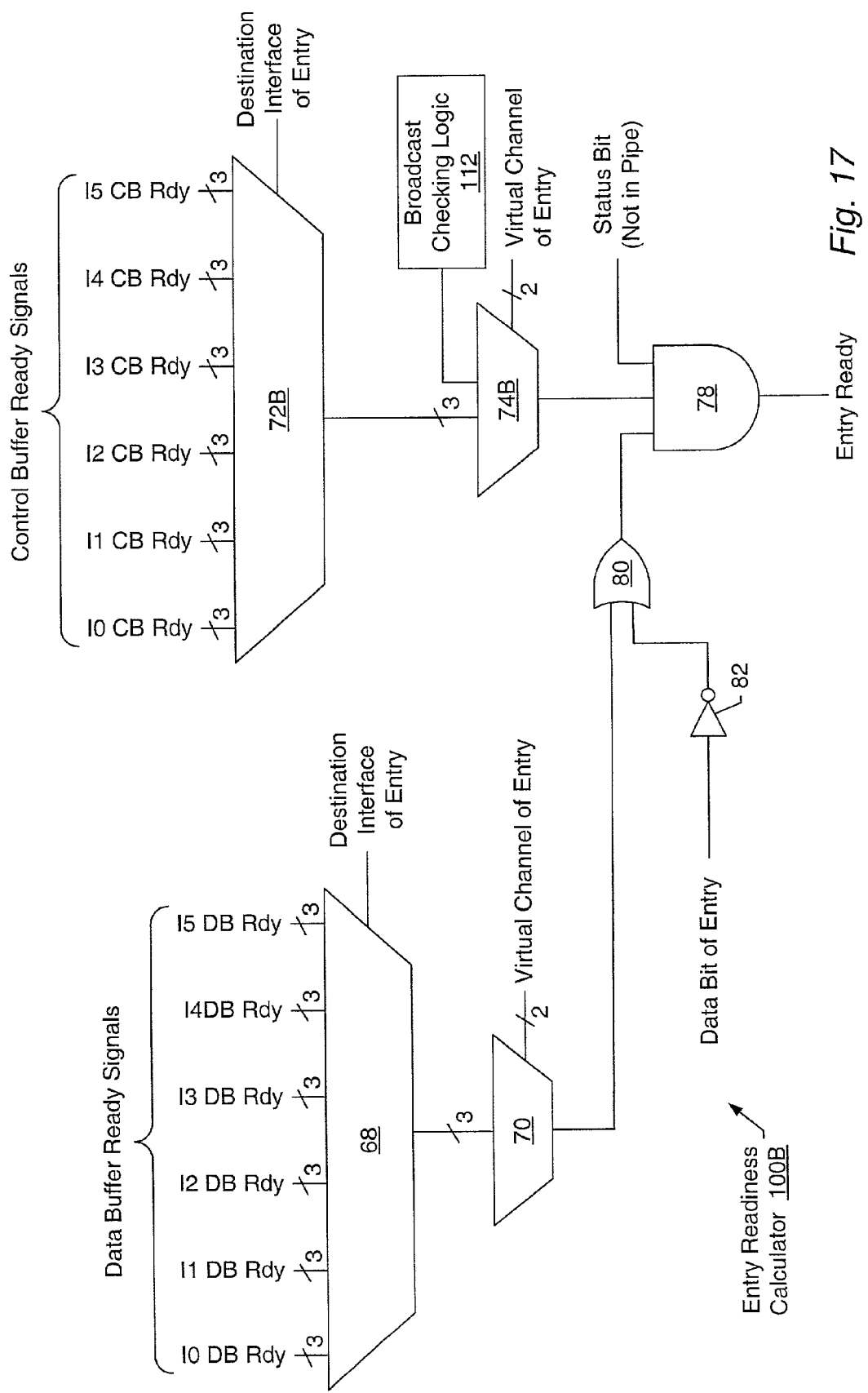
FIG. 17 illustrates another embodiment of logic that may be used to determine whether a scheduler entry is ready to be scheduled.
Figure 18:
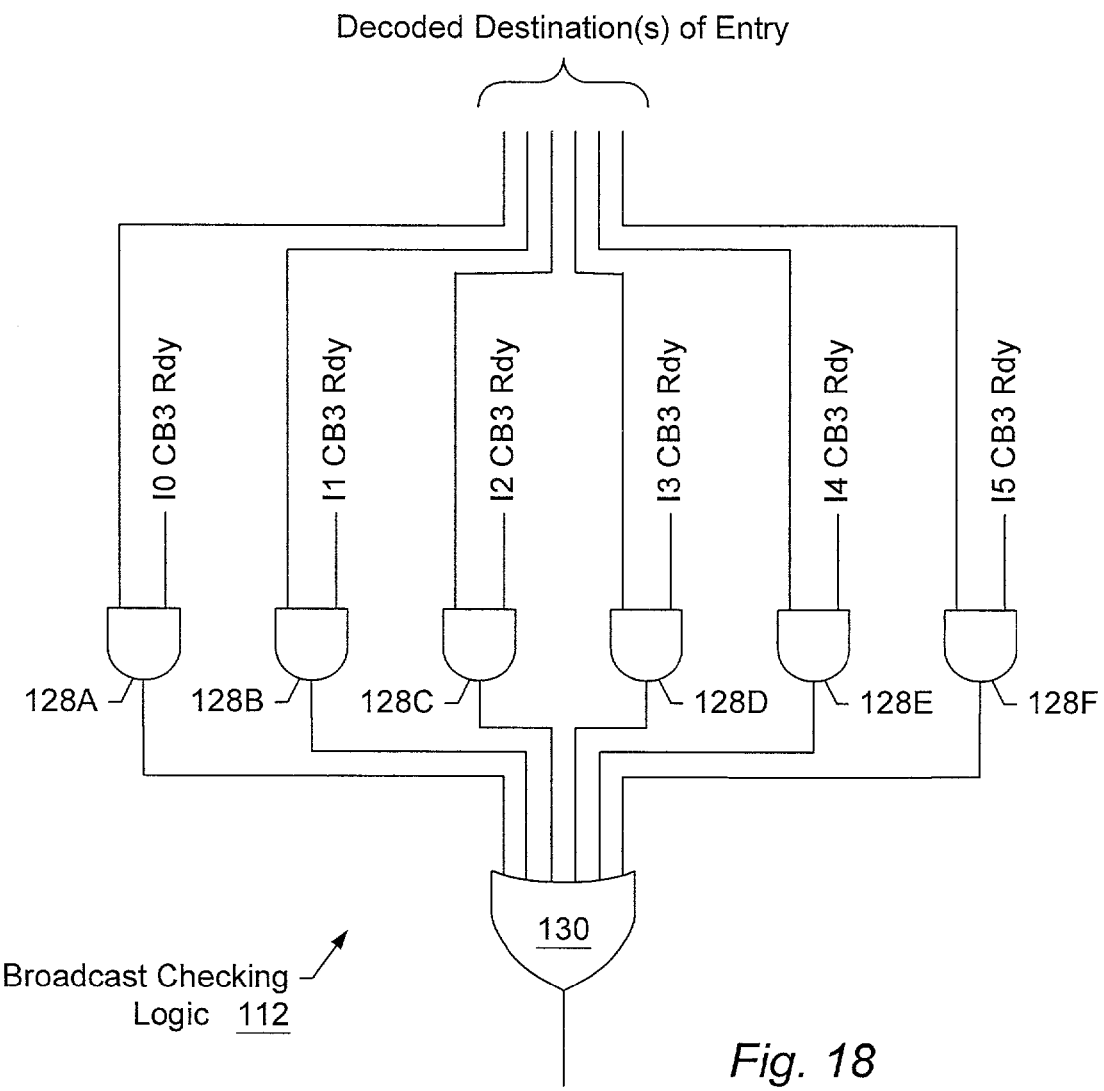
FIG. 18 illustrates an embodiment of logic that may be used to determine whether a scheduler entry that has multiple destinations is ready to be scheduled.

Another embodiment may route the broadcast packet as long as at least one destination has an input buffer ready to receive the packet. If the broadcast packet is not routed to all of its destinations, the router may modify the entry for the broadcast packet so that the destination field only shows the destinations that are remaining. For example, if the packet with destinations I0, I3, and I4 is routed to I0 and I3 in one scheduling turn, the router may modify the entry so that only a single destination, I4, remains in the destination field. The packet may then be routed to I4 at a later time when an input buffer is available at I4. In the worst-case scenario, a packet may be scheduled as many times as it has destinations if only one destination has input buffers available at a time. However, in other situations, the packet may be routed to multiple destinations in a single scheduling turn, and thus fewer turns may be required to fully route the packet to each of its destinations. FIGS. 17 and 18 show one embodiment of an entry readiness calculator for use with such an embodiment.

In the embodiment shown in FIG. 17, the entry readiness calculator 100B is similar to the entry readiness calculator 100 shown in FIG. 11. However, the readiness of an entry that is in the broadcast channel is determined based on broadcast checking logic 112. For non-broadcast entries, the buffer ready signals are input to the multiplexer 72B and the appropriate ready signals are selected based on the single destination (which may be a decoded value) of each of these entries. Based on the virtual channel of the entry, a signal from one of the outputs of the multiplexer 72B or the output from the broadcast checking logic 112 is selected by the multiplexer 74B. The entry ready signal may be asserted if the signal selected by the multiplexer 74B is asserted, a data buffer is available (if necessary), and, if the scheduling process is pipelined, the entry is not already being scheduled (based on the pipeline status bit).

FIG. 18 shows one embodiment of the broadcast checking logic 112. The broadcast checking logic 112 determines whether at least one of the broadcast packet's destinations is ready by ANDing the decoded destination signals with the buffer ready signals for each interface's CB3, which corresponds to the broadcast channel. This way, the relevant signals for each of the destinations are selected and input to OR gate 130. As a result, as long as at least one of the destinations has a control buffer available for the broadcast virtual channel, the output of the OR gate 130 may be asserted, allowing the entry ready signal to be asserted.

Note that in some embodiments, packets in any virtual channel (as opposed to just the broadcast virtual channel) may have multiple destinations. In these embodiments, the entry readiness calculators may be modified to allow for multiple destinations in each virtual channel, not just the broadcast virtual channel.

Figure 19:
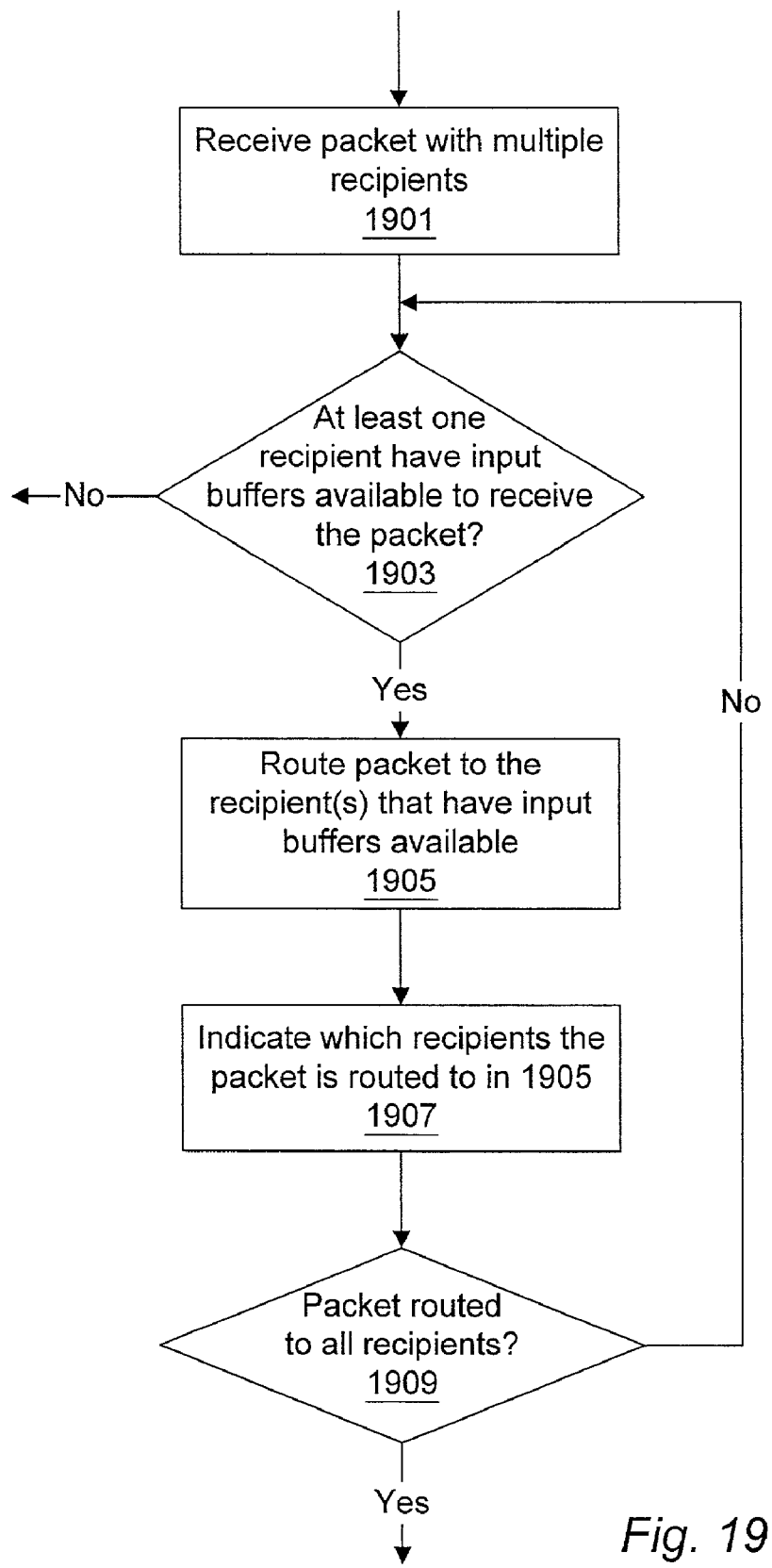
FIG. 19 is a flowchart of another embodiment of a method of routing packets within a node.

FIG. 19 shows one embodiment of a method for routing a packet having multiple destinations within a node. At 1901, a packet that has multiple destinations is received by the node. The node may determine whether any of the packet's recipients have input buffers available to receive the packet, as indicated at 1903. If at least one of the packet's recipients is ready to receive the packet, the packet may be routed to its destination output port(s) within the node that output packets to the ready recipient(s), as shown at 1905 and 1907. Note that step 1907 may depend on other considerations as well. For example, if an older packet is also ready to be routed, the older packet may be routed instead of the multi-destination packet.

In order to avoid routing the packet to the same destinations more than once, the scheduler may track which recipients the packet has already been routed to, as shown at 1207. Indicating which recipients the packet has been routed to may involve modifying a scheduler entry that corresponds to the packet so that it no longer lists those recipients. Once the packet has been routed to all of its destinations, the entry for that packet may be deleted.

Pipelined Scheduling

As mentioned earlier, scheduling may be pipelined in some embodiments. FIG. 20A illustrates how scheduling may be pipelined in one such embodiment. In this embodiment, one scheduler entry may be selected and the packet(s) corresponding to that entry may be routed to their destination interface(s) each scheduling turn.

The scheduling turns may be pipelined into six pipeline stages. Stage 1 involves generating and latching the ready signals for each entry in the scheduler. For example, entry readiness calculators like those shown in FIGS. 11, 14, and 17 may be used to calculate entry ready signals.

During pipeline stages 2 and 3, the oldest ready entry may be selected by scanning through the entry ready signals from the oldest entry towards the youngest entry until a ready entry is located. As the number of entries in the scheduler increases, the time required to scan through all of the entry ready signals looking for the oldest ready entry may increase. If the time required to scan through all of the entries is significantly longer than the time required to perform the operations in any of the other pipeline stages, it may be desirable to subdivide the scanning operation into two or more pipeline stages in order to increase the pipeline clock rate. For example, in this embodiment, two stages are used to select the oldest ready entry in order to avoid having to scan all of the scheduler entries in a single stage. In stage 2, each subgroup may be scanned in parallel, and the oldest ready entry may be selected from each subgroup. Then, in stage 3, the oldest entry of those selected in stage 2 may be selected. Note that in other embodiments, stages 2 and 3 may be performed in a single stage.

In stage 2, the oldest entry that is ready may be selected in each of several subgroups of entries in the scheduler. For example, in the embodiment of the scheduler shown in FIG. 20C, there are 64 entries. In order to reduce the amount of time it takes to scan for the oldest ready entry, the 64 entries have been subdivided into four groups of 16 entries each (groups I-IV). During stage 2, the four groups may be scanned simultaneously and the oldest ready entry in each may be selected. In order to keep these entries from being selected in stage 2 of the next scheduling turn, the status bit that indicates that the entry is schedulable may be cleared in each selected entry, preventing an entry ready signal from being generated for these entries in stage 1 of the next scheduling turn. During stage 3, the oldest ready entry selected in stage 2 is selected. Most of the time, the entry selected in stage 3 may be the entry that was selected from the oldest group of entries (e.g., group I in this embodiment). However, if none of the entries in group I are ready in stage 1, no entry may be selected from group I in stage 2, and thus the entry selected in stage 3 may be selected from one of the newer groups II-IV. After an entry is selected in stage 3, the status bit may be reset in those entries that were selected in stage 2 but not selected in stage 3.

In stage 4, the data contained in the entry selected in stage 3 is read out of the router. Due to the pipelined scheduling, an input buffer that was available in stage 1 of this scheduling turn may have already been used to store a packet corresponding to an entry that was selected in a previous scheduling turn. Thus, in order to avoid overruning the buffers at the destination, the readiness of the selected entry is rechecked in stage 5, and if the entry is still ready (i.e., a buffer is still available), the packet corresponding to the entry may still be routed. Generally, stage 5 may determine whether to commit to routing the packet corresponding to the selected entry. Once committed, the input buffer counts for the interface whose input buffers had previously been storing the packet corresponding to the selected entry may be readjusted and this interface may send updated buffer counts to the interface or device it communicates with. Additionally, the buffer counts that are associated with the sending interface (i.e., the buffer counts maintained in the router that indicate how many buffers are available at the interface with which the sending interface communicates) may also be incremented. In stage 6, the packet corresponding to the selected entry is sent to its destination interface and the selected entry may be deleted from the scheduler.

In embodiments where broadcast packets may have multiple destinations, different input buffers may be available in stage 5 than were available in stage 1. For example, a broadcast entry that has destinations I0, I2, I3, and I5 may be scheduled based on buffers being available for I0 and I3. In the commitment phase of stage 5, this entry's readiness may be rechecked. At this time, a buffer may be available for I2 but not for I0 or I3. However, since the broadcast packet is still able to be routed to at least one of its destinations (I2), the entry may commit. In stage 6, the corresponding packet may be sent to I2 and the entry may be modified (as opposed to deleted) so that it no longer lists I2 as a destination. Thus, at the end of that scheduling turn, the entry may list I0, I3, and I5 as its destinations.

In FIG. 20A, scheduling turn 1 illustrates the normal pipelined scheduling process. Each clock, an operation from one of the stages is performed, so scheduling turn 1 takes six clocks to complete.

Scheduling turn 2 illustrates one possible exception to normal operation. Since the scheduling is pipelined, the same entry may be selected in multiple scheduling turns unless that entry is taken out of the selection pool during the first scheduling turn in which it is selected. Thus, each entry may include a status indication that indicates whether that entry is currently selected. Accordingly, if the selection process is broken into stages 2 and 3, one entry from each subgroup may be selected in stage 2, and each selected entry may be marked accordingly to prevent it from being selected in stage 2 of the next scheduling turn. The entries that are not selected in stage 3 may then be marked unselected. This may create an inconsistency during stage 3 of a scheduling turn if an entry is selected from a different subgroup than an entry was selected from in the previous scheduling turn.

For example, if entry 15 is selected for subgroup I and entry 16 is selected for subgroup II during scheduling turn 1, both entries will be marked selected, even though entry 15 is the entry that will be selected during stage 3 of this turn. Thus, during stage 1 of scheduling turn 2, no ready signals may be generated for these two entries. If no other entries in subgroup I are ready during this turn, a ready entry from subgroup II may be selected. However, even though no ready signal is being asserted for entry 16 this stage, entry 16 may be the oldest ready entry at this time, since it was not selected during stage 3 the previous scheduling turn. Updated entry ready signals that show entry 16's readiness may be available one clock later (after entry 16's status bit is reset in stage 3 of scheduling turn 1). Thus, in order to consistently schedule older entries before younger entries, it may be desirable to repeat stage 3 each time an entry is selected from a different subgroup than an entry was selected from in the previous scheduling turn. By repeating stage 3, updated entry ready signals may be considered in order to detect entries that were marked selected during stage 2 of the previous turn but that were not actually selected in stage 3. Note that repeating stage 3 in one scheduling turn may cause any subsequent scheduling turns to stall for one cycle in order to maintain consistency throughout the pipeline.

Scheduling turn 3 illustrates a situation where a selected entry fails to commit in stage 5. For example, if entry readiness is rechecked and an input buffer is no longer available to receive the packet corresponding to the selected entry, the router may choose to not commit to routing that packet since doing so may overrun the receiving input buffers at the destination. If an entry fails to commit, it may be desirable to flush the scheduling pipeline, since there is a possibility that entries selected in subsequent scheduling turns may not be properly scheduled after the entry failed to commit. Thus, scheduling turn 3 illustrates the effect of failing to commit in stage 5. After the pipeline is flushed (in clock 8), the pipeline restarts in clock 9. Clearing the pipeline may prevent entries from being scheduled out of order.

Figure 20B:
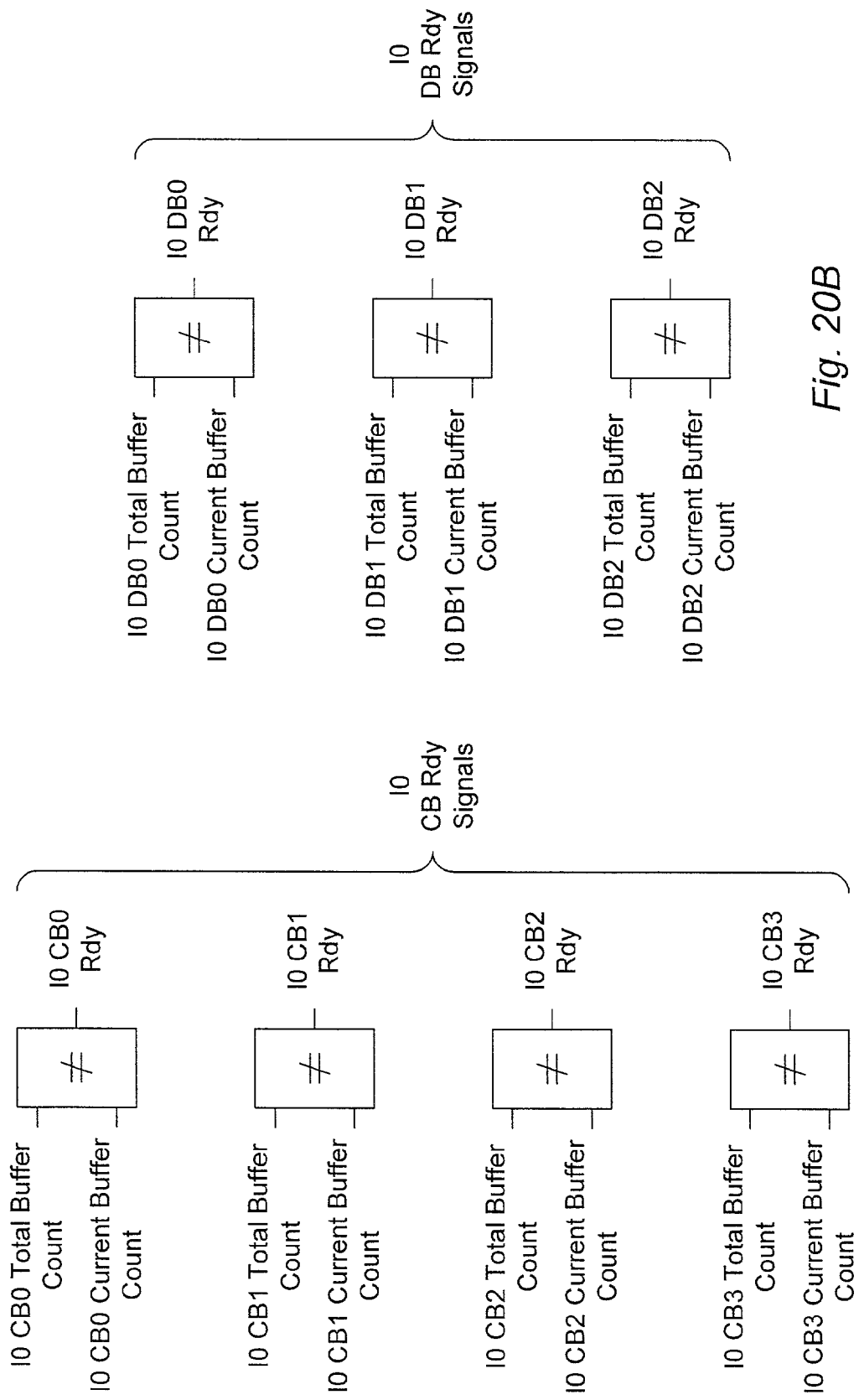
FIG. 20B is a block diagram of one embodiment of a system that may be used to generate the ready signals used in FIGS. 11, 14, 15, 16, 18, and 19.
Figure 20C:
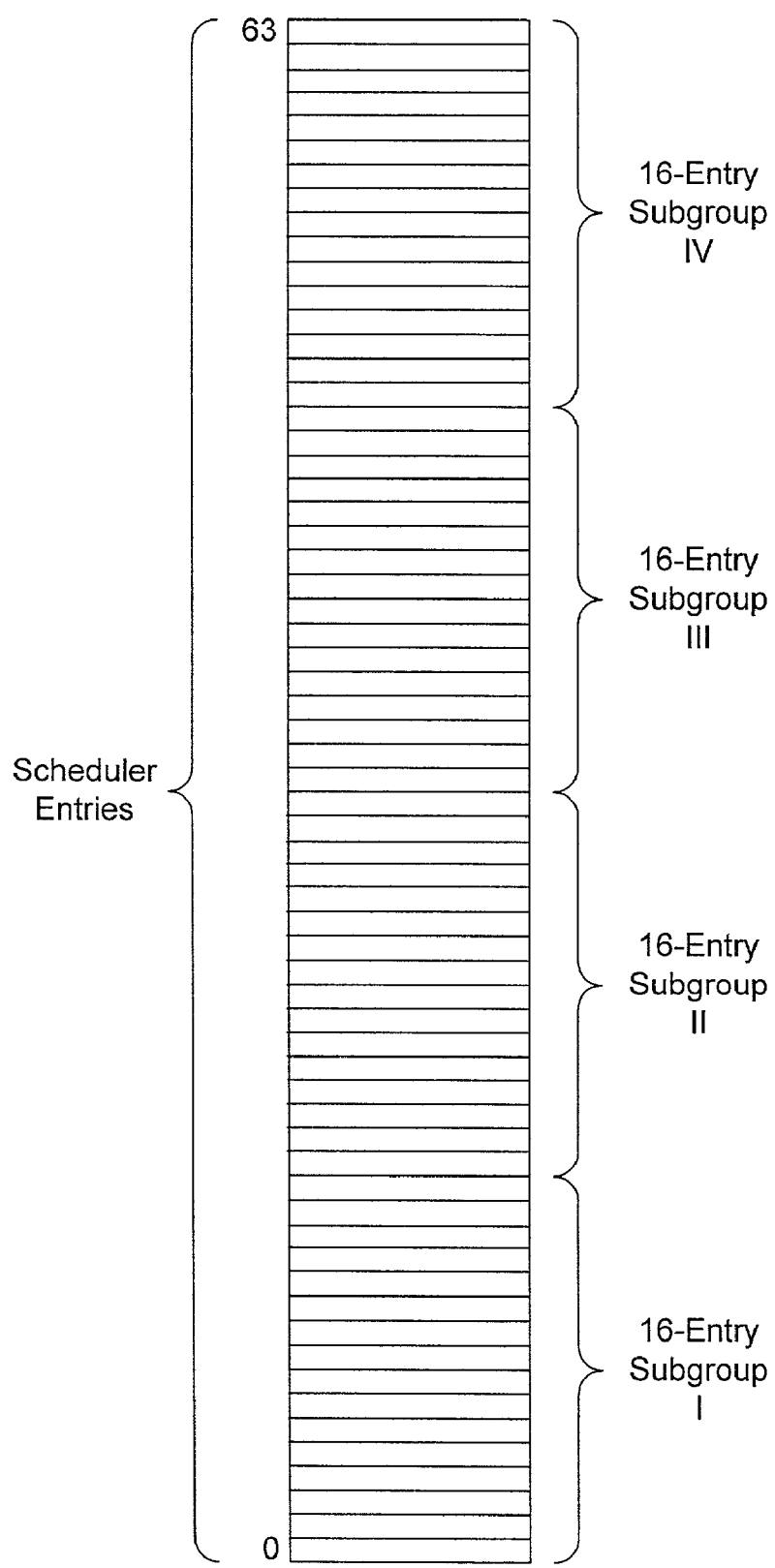
FIG. 20C shows one embodiment of a scheduler and how entries may be divided into subgroups to allow multiple subgroups to be scanned in parallel.

Turning to FIG. 20B, one embodiment of control and data buffer ready signal generators for a particular interface (I0) is shown. In this embodiment, current (the number of currently used buffers) and total input buffer counts are available for I0 and represent the number of current and total input buffers at the node or device I0 transmits packets to. Buffers are available if the current buffer count is less than the total buffer count. Since the current buffer count cannot exceed the total buffer count, each buffer ready signal may be asserted if the current buffer count is not equal to the total buffer count. As discussed above, in other embodiments, the buffer counts may each be tracked using a single register.

Network System

Figure 22:
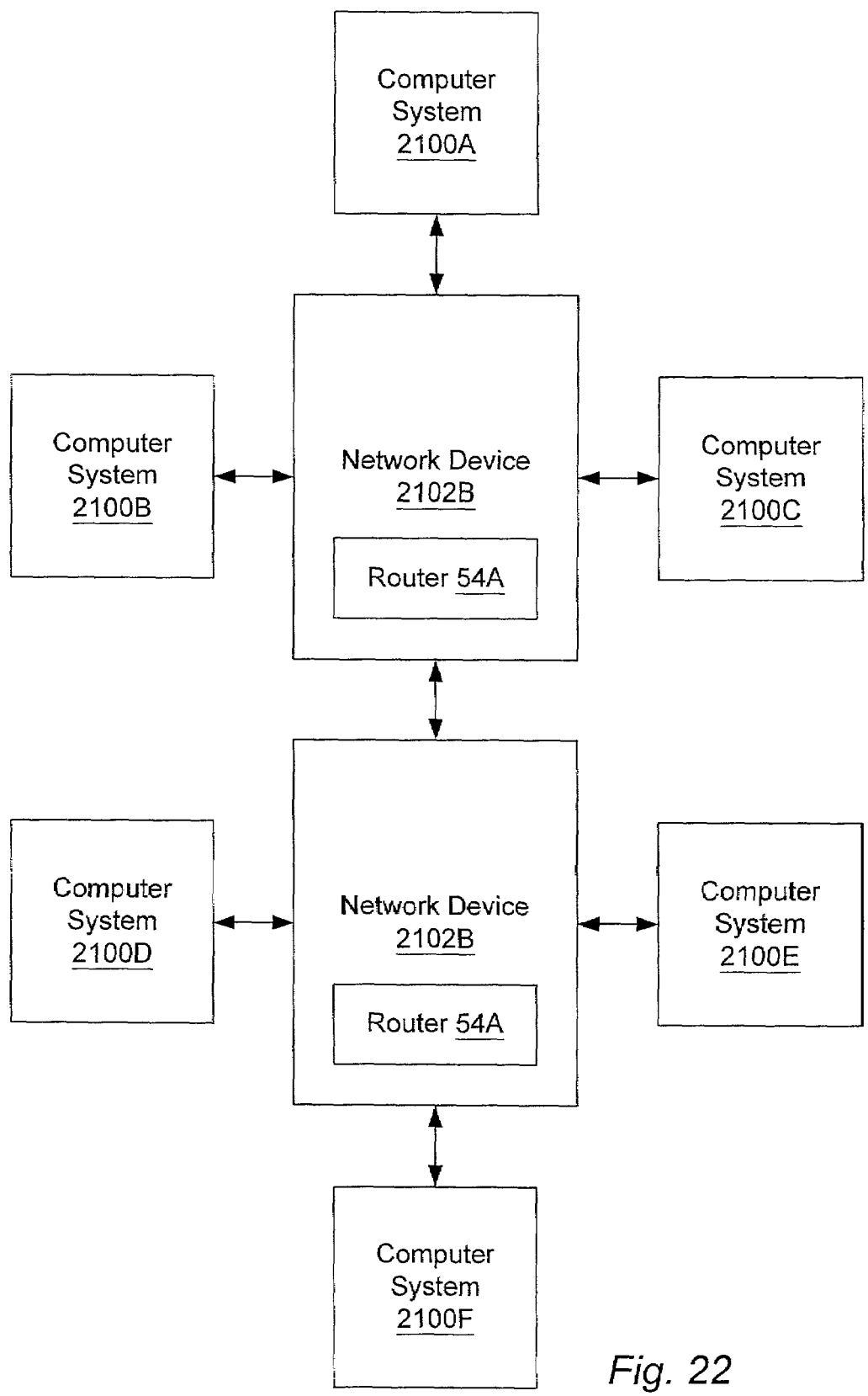
FIG. 22 is a block diagram of one embodiment of a network system that may use a scheduling system similar to the one shown in FIG. 10.

Generally, the scheduler described above may be used in other contexts in addition to the node shown in FIG. 8. For example, FIG. 22 shows a network of computer systems 2100A-C (or 2102B) coupled to a network device 2102A (or 2102B) that includes a router 54A. In this embodiment, a router 54A may connect several different computer systems 2100A-C (or 2100D-F) in a network. Collectively, computer systems 2100A-F may be referred to as computer systems 2100. Each computer system 2100 may send and receive packets to the other computer systems via one or more of the network devices, much like the devices coupled to a node may send and receive packets to the other devices via one or more of the nodes. Furthermore, some computer systems may be connected to multiple network devices, allowing these computer systems to participate in multiple networks (not shown). Additionally, in some embodiments, a network device 2102A maybe connected to another network device 2102B.

Thus, like the node 12 in FIG. 8 included interfaces to other nodes, the network device 2102A may include interfaces to other network devices (e.g., other network devices 2102B) and/or to devices (e.g., computer systems 2100) that generate and consume packets. Each of the network device's interfaces may include an input port and an output port for sending and receiving packets to and from a computer system or another network device. The router 54A may be configured to route packets from an input port to an output port.

The router 54A may be configured in much the same way as the router 54 shown in FIG. 8. The router 54A may include input buffers, and each input buffer may be configured to store packets received from a computer system 2100 or another network device 2102B. Traffic within the network may be subdivided into virtual channels, and each interface's input buffers may include independent input buffers for each virtual channel. The router 54A may schedule packets as described with respect to FIGS. 8-20. For example, the router 54A may maintain a scheduler that allocates entries for each packet received from one of the computer systems 2100 or from another network device 2100B.

Numerous variations and modifications will become apparent to those skilled in the art once the above disclosure is fully appreciated. It is intended that the following claims be interpreted to embrace all such variations and modifications.

What is claimed is:

1. An apparatus comprising:
an input port configured to receive a first packet that has two or more recipients;
two or more output ports that are each configured to output the first packet to one or more of the recipients;
scheduling logic configured to route the first packet to at least one of the output ports if at least one of the recipients has an input buffer available to receive the first packet and even if one or more other ones of the recipients do not have an input buffer available to receive the first packet, and wherein the scheduling logic is configured to subsequently route the first packet to the one or more other ones of the recipients; and
a scheduler configured to allocate an entry corresponding to the first packet in response to the input port receiving the first packet, and wherein the entry comprises a plurality of recipient bits, wherein each recipient bit corresponds to a potential recipient of the recipients coupled to the output ports, wherein a value of each recipient bit identifies whether a respective potential recipient is one of the first packet's recipients, and wherein the scheduling logic is further configured to modify the entry if the scheduling logic routes the first packet to a first portion of the first packet's recipients so that the plurality of recipient bits no longer identify the first portion of the recipients as recipients of the first packet.

2. The apparatus of claim 1, wherein the scheduling logic is further configured to route the first packet to at least one of the output ports if at least one of the recipients that remains identified in the entry has an input buffer available to receive the first packet.

3. The apparatus of claim 1, wherein the scheduler is configured to remove the entry if the entry no longer identifies any recipients.

4. The apparatus of claim 1, further comprising an input buffer configured to store packets received by the input port that are traveling in the first packet's virtual channel.

5. The apparatus of claim 1, wherein the scheduling logic is configured to determine whether at least one of the first packet's recipients has at least one input buffer available to store a packet traveling in the first packet's virtual channel.

6. The apparatus of claim 1, further comprising a plurality of registers, wherein each register is configured to store a count indicative of how many input buffers are currently available at a respective one of the first packet's recipients.

7. The apparatus of claim 6, wherein the scheduling logic is configured to update a first portion of the counts in response to routing the first packet to a first portion of the first packet's recipients so that the counts indicate that each recipient in the first portion of the first packet's recipients has one fewer input buffer currently available.

8. The apparatus of claim 1, wherein the first packet's recipients comprise a device coupled to receive packets from the apparatus.

9. The apparatus of claim 8, wherein the device comprises a CPU.

10. The apparatus of claim 8, wherein the device comprises a memory controller.

11. The apparatus of claim 8, wherein the device comprises a computer system.

12. The apparatus of claim 1, wherein the input port is configured to receive a second packet, and wherein the scheduling logic is configured to route the second packet to at least one of the second packet's recipients before routing the first packet to any of its destinations if at least one of the second packet's recipients has an input buffer available to receive the second packet before any of the first packet's recipients have an input buffer available to receive the first packet.

13. The apparatus of claim 12, wherein the second packet has a single recipient.

14. The apparatus of claim 12, wherein the second packet is received before the first packet.

15. A method of routing packets, the method comprising:
receiving a first packet via an input port, wherein the first packet has two or more recipients;
determining which of the first packet's recipients have at least one input buffer available to receive the first packet;
if at least one recipient of the first packet has at least one input buffer available to receive the first packet, routing the first packet to a first portion of the recipients, wherein each recipient in the first portion of recipients has at least one input buffer available, wherein routing the first packet to the first portion is performed even if one or more other ones of the recipients do not have an input buffer available to receive the first packet;
subsequently routing the first packet to the one or more other ones of the recipients;
allocating an entry corresponding to the first packet in a scheduler in response to said receiving said first packet, wherein the entry identifies the two or more of the first packet's recipients, and wherein the entry comprises a number of recipient bits, wherein the number is equal to a number of possible recipients coupled to receive packets from the node, and wherein a value of each of the recipient bits identifies whether a respective potential recipient is one of the first packet's recipients; and
in response to said routing, modifying the entry so that the plurality of recipient bits no longer identify the first portion of the recipients.

16. The method of claim 15, wherein said routing comprises routing the first packet to a first portion of a plurality of output ports, wherein each output port in the first portion of the output ports outputs packets to a respective one of the first portion of the recipients.

17. The method of claim 15, further comprising:
if after said routing the entry still identifies remaining recipients, said subsequently routing comprises repeating said routing and said modifying until the entry no longer identifies any recipients.

18. The method of claim 17, further comprising removing the entry from the scheduler after the entry no longer identifies any recipients.

19. The method of claim 15, further comprising storing the first packet in a buffer that is configured to store packets received by the input port that are traveling in a virtual channel that the first packet is traveling in.

20. The method of claim 19, wherein said determining comprises determining which of the first packet's recipients have at least one input buffer available in the first packet's virtual channel.

21. The method of claim 15, further comprising maintaining two or more counts that each correspond to a respective one of the first packet's recipients, wherein each count identifies a number of input buffers available at its respective recipient.

22. The method of claim 21, further comprising updating a first portion of the counts that correspond to respective ones of the first portion of the recipients in response to said routing to indicate that one fewer input buffer is available at each of the first portion of the recipients.

23. The method of claim 15, wherein the first packet's recipients comprise a device.

24. The method of claim 23, wherein the device comprises a CPU.

25. The method of claim 23, wherein the device comprises a memory controller.

26. The method of claim 15, wherein the device comprises a computer system.

27. The method of claim 15, further comprising:
receiving a second packet that has one or more recipients via the input port;
determining whether at least one of the second packet's one or more recipients has at least one input buffer available to receive the second packet; and
if at least one of the second packet's one or more recipients has at least one input buffer available to receive the second packet before any of the first packet's recipients have at least one input buffer available to receive the first packet, routing the second packet to the at least one of its recipients before routing the first packet to any of its recipients.

28. The method of claim 27, wherein said receiving a second packet occurs before said receiving a first packet.

29. The method of claim 28, wherein the second packet has a single recipient.

* * * * *